(12) United States Patent
Suzuki

(10) Patent No.: US 7,989,745 B2
(45) Date of Patent: Aug. 2, 2011

(54) SOLID-STATE IMAGING DEVICE WITH FOCUS DETECTION AND ELECTRONIC CAMERA WITH FOCUS ADJUSTMENT

(75) Inventor: Satoshi Suzuki, Tokyo (JP)

(73) Assignee: Nikon Corporation, Tokyo (JP)

(*) Notice: Subject to any disclaimer, the term of this patent is extended or adjusted under 35 U.S.C. 154(b) by 322 days.

(21) Appl. No.: 12/232,796

(22) Filed: Sep. 24, 2008

(65) Prior Publication Data

US 2009/0140122 A1 Jun. 4, 2009

Related U.S. Application Data

(60) Provisional application No. 60/960,487, filed on Oct. 1, 2007, provisional application No. 60/960,488, filed on Oct. 1, 2007.

(30) Foreign Application Priority Data

| Oct. 1, 2007 | (JP) | 2007-257012 |
| Oct. 1, 2007 | (JP) | 2007-257013 |
| Jul. 16, 2008 | (JP) | 2008-184547 |

(51) Int. Cl.
- *G02B 27/64* (2006.01)
- *H01L 27/00* (2006.01)
- *H04N 5/335* (2011.01)

(52) U.S. Cl. .......... 250/201.2; 250/208.1; 348/294

(58) Field of Classification Search .......... 348/345, 348/349, 352, 294, 302, 311, 340; 396/104, 396/121, 123, 125, 128, 139, 110; 358/448, 358/469, 480, 486, 453, 504; 355/77, 55, 56

See application file for complete search history.

(56) References Cited

U.S. PATENT DOCUMENTS

| 6,829,008 B1 * | 12/2004 | Kondo et al. | 348/302 |
| 6,882,366 B1 * | 4/2005 | Kijima et al. | 348/294 |
| 6,933,978 B1 * | 8/2005 | Suda | 348/345 |
| 2002/0121652 A1 * | 9/2002 | Yamasaki | 257/222 |
| 2006/0291844 A1 * | 12/2006 | Kakkori | 396/89 |

FOREIGN PATENT DOCUMENTS

| JP | A-2003-244712 | 8/2003 |
| JP | A-2006-261929 | 9/2006 |
| JP | A-2007-208685 | 8/2007 |

* cited by examiner

*Primary Examiner* — Georgia Y Epps
*Assistant Examiner* — Jennifer Bennett
(74) *Attorney, Agent, or Firm* — Oliff & Berridge, PLC

(57) ABSTRACT

A solid-state imaging device comprises a plurality of pixels disposed in a two-dimensional pattern and each equipped with a photoelectric conversion unit that generates and accumulates a signal charge corresponding to a subject image formed with light entering from an optical system and a readout control unit that executes control under which signals are read out from the plurality of pixels. The plurality of pixels include a plurality of imaging pixels that output imaging signals for forming image signals that represents the subject image and a plurality of focus detection pixels that output focus detection signals for detecting a focusing condition of the optical system through a split-pupil phase difference method.

19 Claims, 31 Drawing Sheets

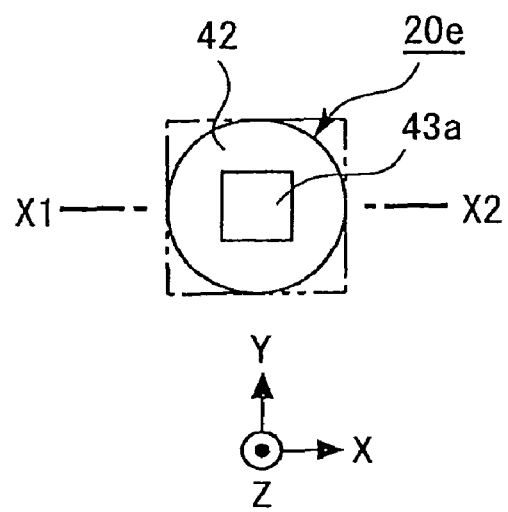
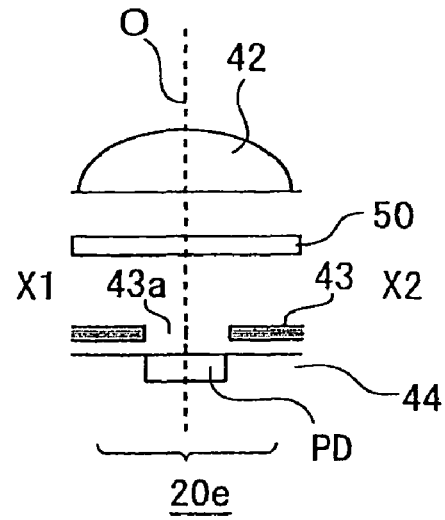
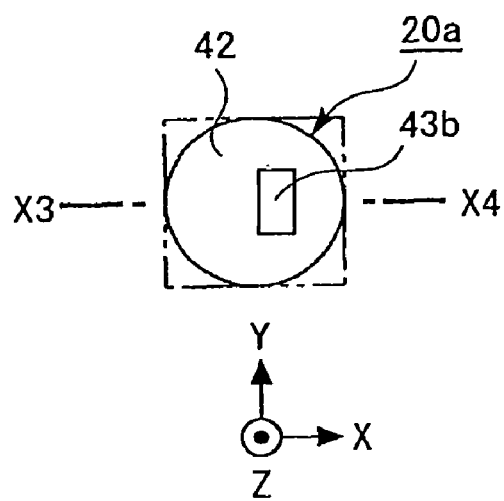
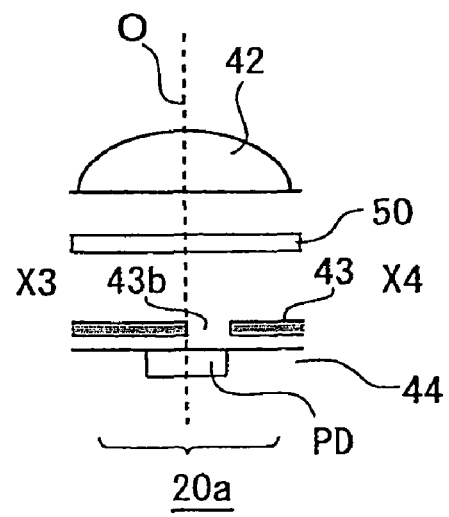

FIG.16

| Pixel Block Row Number | Pixel Row Number | AE PD SIGNAL (READ FROM TWO SUCCESSIVE ROWS, SKIPPING TWO ROWS) | TX | FD SIGNAL | SEL | OUTPUT |
|---|---|---|---|---|---|---|
| 1 | 1 | G | | | | |
|   | 2 | R | ② | R | O | R |
| 2 | 3 | G | ① | | | |
|   | 4 | R | | G | O | G |
| 3 | 5 | G | | | | |
|   | 6 | R | ② | R | O | R |
| 4 | 7 | G | ① | | | |
|   | 8 | R | | G | O | G |
| 5 | 9 | G | | | | |
|   | 10 | R | ② | R | O | R |
| 6 | 11 | G | ① | | | |
|   | 12 | R | | G | O | G |
| 7 | 13 | G | | | | |
|   | 14 | R | ② | R | O | R |
| 8 | 15 | G | ① | | | |
|   | 16 | R | | G | O | G |
| 9 | 17 | G | | | | |
|   | 18 | R | ② | R | O | R |
| 10 | 19 | G | ① | | | |
|   | 20 | R | | G | O | G |
| 11 | 21 | G | | | | |
|   | 22 | R | ② | R | O | R |
| 12 | 23 | G | ① | | | |
|   | 24 | R | | G | O | G |
| 13 | 25 | G | | | | |
|   | 26 | R | ② | R | O | R |
| 14 | 27 | G | ① | | | |
|   | 28 | R | | G | O | G |
| 15 | 29 | G | | | | |
|   | 30 | R | ② | R | O | R |
| 16 | 31 | G | ① | | | |
|   | 32 | R | | G | O | G |
| 17 | 33 | G | | | | |
|   | 34 | R | ② | R | O | R |
| 18 | 35 | G | ① | | | |
|   | 36 | R | | G | O | G |
| 19 | 37 | G | | | | |
|   | 38 | R | ② | R | O | R |
| 20 | 39 | G | ① | | | |
|   | 40 | R | | G | O | G |
| 21 | 41 | G | | | | |
|   | 42 | R | ② | R | O | R |
| 22 | 43 | G | ① | | | |
|   | 44 | R | | G | O | G |
| 23 | 45 | G | | | | |
|   | 46 | R | ② | R | O | R |
| 24 | 47 | G | ① | | | |
|   | 48 | R | | G | O | G |
| 25 | 49 | G | | | | |
|   | 50 | R | ② | R | O | R |

PD: PHOTODIODE
TX: TRANSFER TRANSISTOR (1) INDICATES THAT TRANSISTORS TX1 IN THE INDIVIDUAL PIXEL BLOCKS ENTER AN ON STATE SIMULTANEOUSLY, WHEREAS (2) INDICATES THAT THE TRANSISTOR TX2 IN THE INDIVIDUAL PIXEL BLOCKS ENTER AN ON STATE SIMULTANEOUSLY
SEL: SELECTOR TRANSISTOR; SEL INDICATED BY THE CIRCLES ENTER AN ON STATE IN SEQUENCE
OUTPUT: PIXEL OUTPUT TO THE VERTICAL SIGNAL LINES

FIG.17

PIXEL BLOCK ROW NUMBER / PIXEL ROW NUMBER / PD SIGNAL AE: READ FROM TWO SUCCESSIVE ROWS (SKIPPING SIX ROWS) / FD SIGNAL

| PIXEL BLOCK ROW NUMBER | PIXEL ROW NUMBER | PD SIGNAL AE | TX | FD SIGNAL | SEL | OUTPUT |
|---|---|---|---|---|---|---|
| 1 | 1 | G | | | | |
|   | 2 | R | ② | R | O | R |
| 2 | 3 | G | ① | | | |
|   | 4 | R | | G | O | G |
| 3 | 5 | G | | | | |
|   | 6 | R | ② | R | | |
| 4 | 7 | G | ① | | | |
|   | 8 | R | | G | | |
| 5 | 9 | G | | | | |
|   | 10 | R | ② | R | O | R |
| 6 | 11 | G | ① | | | |
|   | 12 | R | | G | O | G |
| 7 | 13 | G | | | | |
|   | 14 | R | ② | R | | |
| 8 | 15 | G | ① | | | |
|   | 16 | R | | G | | |
| 9 | 17 | G | | | | |
|   | 18 | R | ② | R | O | R |
| 10 | 19 | G | ① | | | |
|   | 20 | R | | G | O | G |
| 11 | 21 | G | | | | |
|   | 22 | R | ② | R | | |
| 12 | 23 | G | ① | | | |
|   | 24 | R | | G | | |
| 13 | 25 | G | | | | |
|   | 26 | R | ② | R | O | R |
| 14 | 27 | G | ① | | | |
|   | 28 | R | | G | O | G |
| 15 | 29 | G | | | | |
|   | 30 | R | ② | R | | |
| 16 | 31 | G | ① | | | |
|   | 32 | R | | G | | |
| 17 | 33 | G | | | | |
|   | 34 | R | ② | R | O | R |
| 18 | 35 | G | ① | | | |
|   | 36 | R | | G | O | G |
| 19 | 37 | G | | | | |
|   | 38 | R | ② | R | | |
| 20 | 39 | G | ① | | | |
|   | 40 | R | | G | | |
| 21 | 41 | G | | | | |
|   | 42 | R | ② | R | O | R |
| 22 | 43 | G | ① | | | |
|   | 44 | R | | G | O | G |
| 23 | 45 | G | | | | |
|   | 46 | R | ② | R | | |
| 24 | 47 | G | ① | | | |
|   | 48 | R | | G | | |
| 25 | 49 | G | | | | |
|   | 50 | R | ② | R | O | R |

PD: PHOTODIODE
TX: TRANSFER TRANSISTOR (1) INDICATES THAT TRANSISTORS TX1 IN THE INDIVIDUAL PIXEL BLOCKS ENTER AN ON STATE SIMULTANEOUSLY, WHEREAS (2) INDICATES THAT THE TRANSISTOR TX2 IN THE INDIVIDUAL PIXEL BLOCKS ENTER AN ON STATE SIMULTANEOUSLY
SEL: SELECTOR TRANSISTOR; SEL INDICATED BY THE CIRCLES ENTER AN ON STATE IN SEQUENCE
OUTPUT: PIXEL OUTPUT TO THE VERTICAL SIGNAL LINES

FIG. 18

AE: READ FROM TWO SUCCESSIVE ROWS (SKIPPING TEN ROWS)

| PIXEL BLOCK ROW NUMBER | PIXEL ROW NUMBER | PD SIGNAL | TX | FD SIGNAL | SEL | OUTPUT |
|---|---|---|---|---|---|---|
| 1 | 1 | G | | | | |
| 1 | 2 | R | ② | R | O | R |
| 2 | 3 | G | ① | | | |
| 2 | 4 | R | | G | O | G |
| 3 | 5 | G | | | | |
| 3 | 6 | R | ② | R | | |
| 4 | 7 | G | ① | | | |
| 4 | 8 | R | | G | | |
| 5 | 9 | G | | | | |
| 5 | 10 | R | ② | R | | |
| 6 | 11 | G | ① | | | |
| 6 | 12 | R | | G | | |
| 7 | 13 | G | | | | |
| 7 | 14 | R | ② | R | O | R |
| 8 | 15 | G | ① | | | |
| 8 | 16 | R | | G | O | G |
| 9 | 17 | G | | | | |
| 9 | 18 | R | ② | R | | |
| 10 | 19 | G | ① | | | |
| 10 | 20 | R | | G | | |
| 11 | 21 | G | | | | |
| 11 | 22 | R | ② | R | | |
| 12 | 23 | G | ① | | | |
| 12 | 24 | R | | G | | |
| 13 | 25 | G | | | | |
| 13 | 26 | R | ② | R | O | R |
| 14 | 27 | G | ① | | | |
| 14 | 28 | R | | G | O | G |
| 15 | 29 | G | | | | |
| 15 | 30 | R | ② | R | | |
| 16 | 31 | G | ① | | | |
| 16 | 32 | R | | G | | |
| 17 | 33 | G | | | | |
| 17 | 34 | R | ② | R | | |
| 18 | 35 | G | ① | | | |
| 18 | 36 | R | | G | | |
| 19 | 37 | G | | | | |
| 19 | 38 | R | ② | R | O | R |
| 20 | 39 | G | ① | | | |
| 20 | 40 | R | | G | O | G |
| 21 | 41 | G | | | | |
| 21 | 42 | R | ② | R | | |
| 22 | 43 | G | ① | | | |
| 22 | 44 | R | | G | | |
| 23 | 45 | G | | | | |
| 23 | 46 | R | ② | R | | |
| 24 | 47 | G | ① | | | |
| 24 | 48 | R | | G | | |
| 25 | 49 | G | | | | |
| 25 | 50 | R | ② | R | O | R |

PD: PHOTODIODE
TX: TRANSFER TRANSISTOR (1) INDICATES THAT TRANSISTORS TX1 IN THE INDIVIDUAL PIXEL BLOCKS ENTER AN ON STATE SIMULTANEOUSLY, WHEREAS (2) INDICATES THAT THE TRANSISTOR TX2 IN THE INDIVIDUAL PIXEL BLOCKS ENTER AN ON STATE SIMULTANEOUSLY
SEL: SELECTOR TRANSISTOR; SEL INDICATED BY THE CIRCLES ENTER AN ON STATE IN SEQUENCE
OUTPUT: PIXEL OUTPUT TO THE VERTICAL SIGNAL LINES

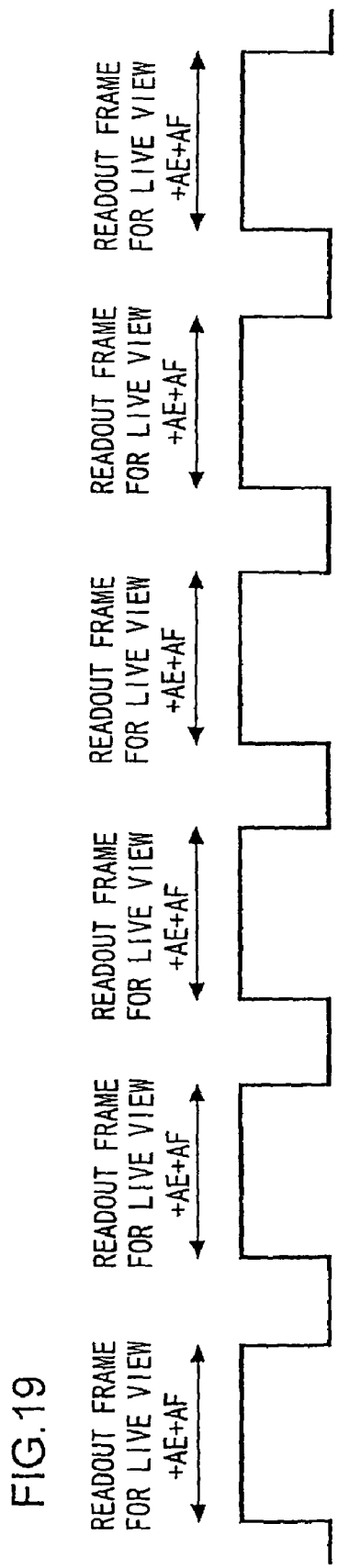

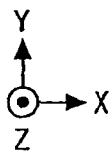

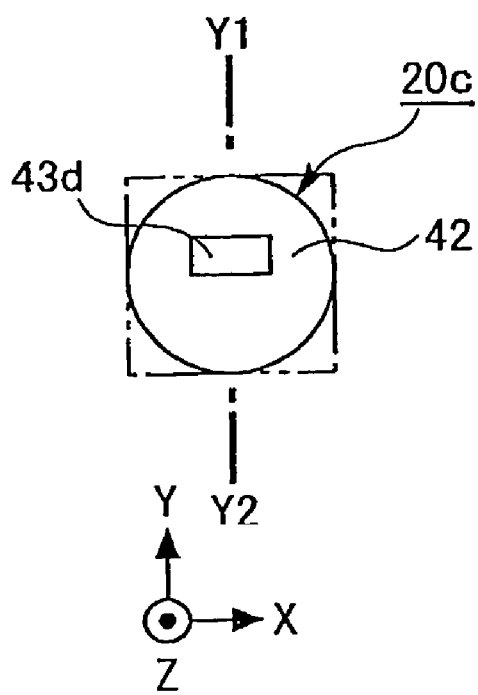
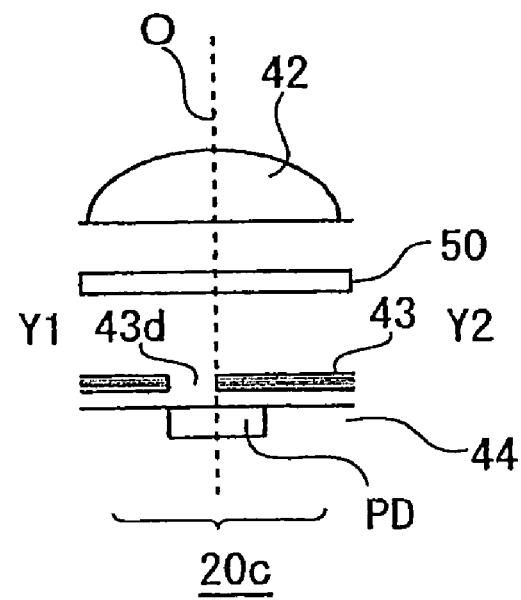

SOLID-STATE IMAGING DEVICE WITH FOCUS DETECTION AND ELECTRONIC CAMERA WITH FOCUS ADJUSTMENT

This non-provisional application claims the benefit of U.S. Provisional Application No. 60/960,487 filed Oct. 1, 2007 and U.S. Provisional Application No. 60/960,488 filed Oct. 1, 2007. This application also claims priority from Japanese Application No. 2007-257012 filed Oct. 1, 2007, Japanese Application No. 2007-257013 filed Oct. 1, 2007 and Japanese Application No. 2008-184547 filed Jul. 16, 2008. The disclosure of each of the earlier applications is incorporated herein by reference in its entirety.

BACKGROUND OF THE INVENTION

1. Field of the Invention

The present invention relates to a solid-state imaging device and an electronic camera equipped with the solid-state imaging device.

2. Description of Related Art

Today, electronic cameras such as video cameras and electronic still cameras with an AF (autofocus) function are widely used by consumers. Such a camera typically includes a solid-state image sensor which may be, for instance, a CCD sensor or a CMOS sensor. The solid-state image sensor is constituted with a plurality of pixels, each equipped with a photoelectric conversion unit that generates a signal charge in correspondence to the amount of incoming light, arrayed in a two-dimensional matrix pattern.

Focus detection is executed in such an electronic camera in the related art through the contrast method, which enables AF based upon image signals provided from the solid-state image sensor. In the contrast method, the contrast is determined based upon image signals obtained through small adjustments of the focal length of the lens and the focus match is achieved by driving the lens to the position at which the contrast is at the highest level. This means that the focus match cannot be achieved quickly through the contrast method.

Japanese Laid Open Patent Publication No. 2006-261929 discloses an electronic camera adopting the contrast method described above. The camera includes a display unit disposed at the rear surface thereof or the like and constituted with a liquid crystal panel or the like, at which a live view image is brought up on display. The live view image, generated based upon the image signals from the solid-state image sensor, helps the user easily verify the photographing conditions including the subject framing state prior to the primary photographing operation.

The camera reads image signals from a CCD color area sensor by switching to a live view read mode and a summing read mode in correspondence to alternate frames when the brightness of the subject is low. At the display unit of the camera, an image is brought up on display based upon live view image signals read out while the live view read mode is on. The AF control unit of the camera executes AF control through the contrast method based upon brightness sum image signals read out while the summing read mode is on. In the live view read mode, live view image signals are generated based upon electrical charges read out through a discriminative read of a plurality of photoelectric conversion elements arrayed along the vertical direction at the CCD color area sensor by reading out electrical charges over intervals corresponding to a predetermined number of photoelectric conversion elements. In the summing read mode, brightness sum image signals are each generated by reading out the sum of electrical charges generated via a plurality of photoelectric conversion elements arrayed successively along the vertical direction or the horizontal direction at the CCD color area sensor.

Accordingly, when the brightness of the subject is lower, the AF control is executed in the electronic camera described above through the contrast method based upon the brightness sum image signals assuring a higher output level at a given level of ambient light compared to the output obtained through a regular read operation. As a result, stable AF control is assured through the contrast method. In addition, when the brightness of the subject is lower, an image is displayed at the display unit based upon the live view image signals. The subject color information can thus be obtained from the image on display.

The electronic camera switches between the live view read mode and the summing read mode only when the brightness of the subject is low and the switchover does not take place under normal circumstances in which the brightness of the subject is relatively high.

A solid-state image sensor assuming a structure that allows it to also function as a focus detection element adopting the split-pupil phase difference focus detection method has been proposed in recent years (see Japanese Laid Open Patent Publication No. 2003-244712). The split-pupil phase difference method differs from the contrast method in that it eliminates the trial and error approach with regard to the lens position, making it possible to achieve the focus match quickly.

The solid-state image sensor disclosed in Japanese Laid Open Patent Publication No. 2003-244712 includes a plurality of focus detection pixels (may also be referred to as "AF pixels") via which focus detection signals to be used to detect the focusing condition through the split-pupil phase difference method are generated, disposed therein in addition to imaging pixels that output imaging signals used to express the subject image. The AF pixels in the solid-state image sensor each include a photoelectric conversion unit split into two separate portions. Over the photoelectric conversion units, micro lenses are disposed each in correspondence to one of the pixels. The two split photoelectric conversion units are disposed at a position at which the exit pupil of the imaging lens is image-formed by the micro lens, i.e., at a position substantially conjugate with the position of the exit pupil of the imaging lens relative to the micro lens. This means that since the distance between the exit pupil of the imaging lens and the micro lens is sufficiently long in relation to the size of the micro lens, the two split photoelectric conversion units are disposed at a position substantially matching the focusing position of the micro lens. At each AF pixel assuming the positional relationship described above, one of the two split photoelectric conversion units selectively receives light flux departing an area ranging over part of the exit pupil of the imaging lens and offset along a specific direction relative to the center of the exit pupil and the light flux thus received undergoes photoelectric conversion at the particular photoelectric conversion unit. The other photoelectric conversion unit at the AF pixel selectively receives a light flux departing the area ranging over part of the exit pupil of the imaging lens and offset along the opposite direction relative to the center of the exit pupil and the light flux thus received undergoes photoelectric conversion at the other photoelectric conversion unit.

An object of the present invention is to provide an electronic camera that includes a solid-state image sensor assuming a structure that allows it to also function as a focus detection element adopting the split-pupil phase difference method, capable of executing both AF control and AE control at high speed in a specific operation mode, and a solid-state imaging device that may be used in such an electronic camera.

Another object of the present invention is to provide an electronic camera capable of displaying a live view image of a subject present in a relatively short range and moving at a relatively high speed in a focus matched state on the subject and an optimal exposure state and also capable of executing AF control and AE control quickly in the particular operation mode and a solid-state imaging device that may be used in this electronic camera.

SUMMARY OF THE INVENTION

The solid-state imaging device according to a first aspect of the present invention comprises a plurality of pixels disposed in a two-dimensional pattern and each equipped with a photoelectric conversion unit that generates and accumulates a signal charge corresponding to a subject image formed with light entering from an optical system and a readout control unit that executes control under which signals are readout from the plurality of pixels. The plurality of pixels in this solid-state imaging device include a plurality of imaging pixels that output imaging signals for forming image signals that represent the subject image and a plurality of focus detection pixels that output focus detection signals for detecting a focusing condition of the optical system through a split-pupil phase difference method.

According to a second aspect of the present invention, in the solid-state imaging device of the first aspect, the readout control unit executes control so as to read out both the focus detection signals and the imaging signals to be used as photometry information for automatic exposure in a single frame while a specific operation mode is set.

According to a third aspect of the present invention, in the solid-state imaging device of the second aspect, the readout control unit executes control so that signals from some of the plurality of pixels are not read out in the frame, in correspondence to which the focus detection signals and the imaging signals are to be read out.

According to a fourth aspect of the present invention, in the solid-state imaging device of the first aspect, the readout control unit sequentially and cyclically executes operation in two or more read modes while a specific operation mode is set. The two or more read modes include a live view read mode in which the imaging signals for live view display and a focus detection and automatic exposure read mode in which the focus detection signals and the imaging signals to be used as photometry information for automatic exposure are read out.

According to a fifth aspect of the present invention, the solid-state imaging device of the fourth aspect further comprises vertical signal lines each disposed in correspondence to one of columns along which the plurality of pixels are arrayed, to which output signals from the pixels in the corresponding columns are provided. In the live view read mode, signals are read out from pixels through a discriminative read executed along the direction in which the columns extend.

According to a sixth aspect of the present invention, in the solid-state imaging device of the fourth or fifth aspect, an electronic shutter operation is executed in the focus detection and automatic exposure read mode for pixels from which valid signals are to be read out so that they are exposed over equal lengths of time with matching timing.

According to a seventh aspect of the present invention, the solid-state imaging device of any one of the fourth through sixth aspects further comprises vertical signal lines each disposed in correspondence to one of columns along which the plurality of pixels are arrayed, to which output signals from the pixels in the corresponding columns are provided. In the focus detection and automatic exposure read mode, signals are readout from pixels through a discriminative read executed along a columnar direction in which the columns extend.

According to an eighth aspect of the present invention, in the solid-state imaging device of the seventh aspect, signals from imaging pixels in two successive rows following each M-row (M is an even number) interval are read out to be used as the photometry information for automatic exposure in the focus detection and automatic exposure read mode.

According to a ninth aspect of the present invention, in the solid-state imaging device of the eighth aspect, the plurality of pixels each further include a charge/voltage conversion unit that takes in the signal charge from the photoelectric conversion unit of the pixel and converts the signal charge to a voltage, an amplifier unit that outputs a signal corresponding to a potential at the charge/voltage conversion unit, a charge transfer unit that transfers the charge from the photoelectric conversion unit to the charge/voltage conversion unit, are set unit that resets the potential at the charge/voltage conversion unit and a selector unit that selects the pixel. The plurality of pixels form pixel blocks each made up with L (L is an even number equal to or greater than 2) pixels with the photoelectric conversion units thereof set side-by-side in sequence along the columnar direction and the L pixels in each pixel block share a common set of the charge/voltage conversion unit, the amplifier unit, the reset unit and the selector unit. M satisfies a condition expressed as; $M=\{L\times(2+N)-2\}$ (N is an integer equal to or greater than 0).

According to a tenth aspect of the present invention, in the solid-state imaging device of the first aspect, the readout control unit sequentially and repeatedly executes operation in one or more read modes while a specific operation mode is set. The one or more read modes include a batch read mode in which the imaging signals for live view display, the focus detection signals and the imaging signals to be used as photometry information for automatic exposure.

According to an eleventh aspect of the present invention, in the solid-state imaging device of the tenth aspect, signals are not read out from some of the plurality of pixels in the batch read mode.

According to a twelfth aspect of the present invention, in the solid-state imaging device of any one of the first through eighth aspects, tenth aspect and the eleventh aspect, the plurality of pixels each further include a charge/voltage conversion unit that takes in the signal charge from the photoelectric conversion unit of the pixel and converts the signal charge to a voltage, an amplifier unit that outputs a signal corresponding to a potential at the charge/voltage conversion unit, a charge transfer unit that transfers the charge from the photoelectric conversion unit to the charge/voltage conversion unit, are set unit that resets the potential at the charge/voltage conversion unit and a selector unit that selects the pixel.

According to a thirteenth aspect of the present invention, in the solid-state imaging device of the twelfth aspect, the plurality of pixels form pixel blocks each made up with L (L is an even number equal to or greater than 2) pixels with the photoelectric conversion units thereof set side-by-side in sequence along a columnar direction in which pixel columns extend. The L pixels in each pixel block share a common set of the charge/voltage conversion unit, the amplifier unit, the reset unit and the selector unit.

According to a fourteenth aspect of the present invention, in the solid-state imaging device of any one of the first through thirteenth aspects, color filters set in a Bayer array are disposed at the plurality of imaging pixels.

The electronic camera according to a fifteenth aspect of the present invention comprises a solid-state imaging device of any one of the second through fourteenth aspects and executes focus adjustment for the optical system through the split-pupil phase difference method and also executes exposure control based upon signals read out in the specific operation mode.

The electronic camera according to a sixteenth aspect of the present invention comprises a solid-state imaging device in any one of the fourth through fourteenth aspects and a display unit at which a live view display can be brought up. While a live view image is on display at the display unit based upon signals read out in the live view read mode, focus adjustment for the optical system is executed through the split-pupil phase difference method and also exposure control is executed based upon signals read out in the focus detection and automatic exposure read mode.

According to a seventeenth aspect of the present invention, in the solid-state imaging device of the first aspect, the read-out control unit executes control so as to read out signals to be used for live view display from the plurality of pixels.

According to an eighteenth aspect of the present invention, in the solid-state imaging device of the first aspect, the read-out control unit sequentially and cyclically executes operation in two or more read modes while a specific operation mode is set. The two or more read modes include a live view read mode in which the imaging signals for live view display are read out and a focus detection read mode in which the focus detection signals are read out.

According to a nineteenth aspect of the present invention, the solid-state imaging device of the eighteenth aspect further comprises vertical signal lines each disposed in correspondence to one of columns along which the plurality of pixels are arrayed, to which output signals from the pixels in the corresponding columns are provided. In the live view read mode, signals are read out from pixels through a discriminative read executed along a columnar direction in which the columns extend.

According to a twentieth aspect of the present invention, in the solid-state imaging device of the eighteenth or nineteenth aspect, an electronic shutter operation is executed in the focus detection read mode for pixels from which valid signals are to be read out so that they are exposed over equal lengths of time with matching timing.

According to a twenty-first aspect of the present invention, in the solid-state imaging device of any one of the eighteenth through twentieth aspects, a partial read through which signals are read out from pixels present over a limited area is executed in the focus detection read mode.

According to a twenty-second aspect of the present invention, in the solid-state imaging device of any one of the eighteenth through twenty-first aspects, the two or more read modes include an automatic exposure read mode in which the imaging signals to be used as photometry information for automatic exposure are read out.

According to a twenty-third aspect of the present invention, in the solid-state imaging device of the twenty-second aspect, an electronic shutter operation is executed in the automatic exposure read mode for pixels from which valid signals are to be read out so that they are exposed over equal lengths of time with matching timing.

According to a twenty-fourth aspect of the present invention, the solid-state imaging device of the twenty-second or twenty-third aspect further comprises vertical signal lines each disposed in correspondence to one of columns along which the plurality of pixels are arrayed, to which output signals from the pixels in the corresponding columns are provided. In the automatic exposure read mode, horizontal pixel summing, through which signals from two or more pixels set along a row direction in which pixel rows extend are added together and a sum of the signals is read out, is executed.

According to a twenty-fifth aspect of the present invention, in the solid-state imaging device of any one of the twenty-second through twenty-fourth aspects, a skipping read, through which signal read from pixels in M rows (M is an even number) is skipped after signals from pixels in two successive rows are read, is repeatedly executed in the automatic exposure read mode.

BRIEF DESCRIPTION OF THE DRAWINGS

FIGS. 5A and 5B schematically illustrate the essential part of an imaging pixel;

FIGS. 6A and 6B schematically illustrate the essential part of an AF pixel;

FIG. 16 presents an example of rows from which AE signals may be read out;

FIG. 17 presents another example of rows from which AE signals may be read out;

FIG. 18 presents yet another example of rows from which AE signals may be read out;

FIG. 19 is a timing chart schematically illustrating the signal read conditions under which signals are read from the solid-state image sensor while the electronic camera achieved in a third embodiment of the present invention is set in a specific operation mode;

FIG. 21 is a schematic plan view showing the effective pixel area of the solid-state image sensor in the fourth embodiment of the present invention;

FIGS. 22A and 22B schematically illustrate the essential part of an AF pixel;

DESCRIPTION OF PREFERRED EMBODIMENTS

The following is a description of the embodiments of the solid-state imaging device according to the present invention and the electronic camera equipped with the solid-state imaging device, given in reference to the drawings.

First Embodiment

Figure 1:
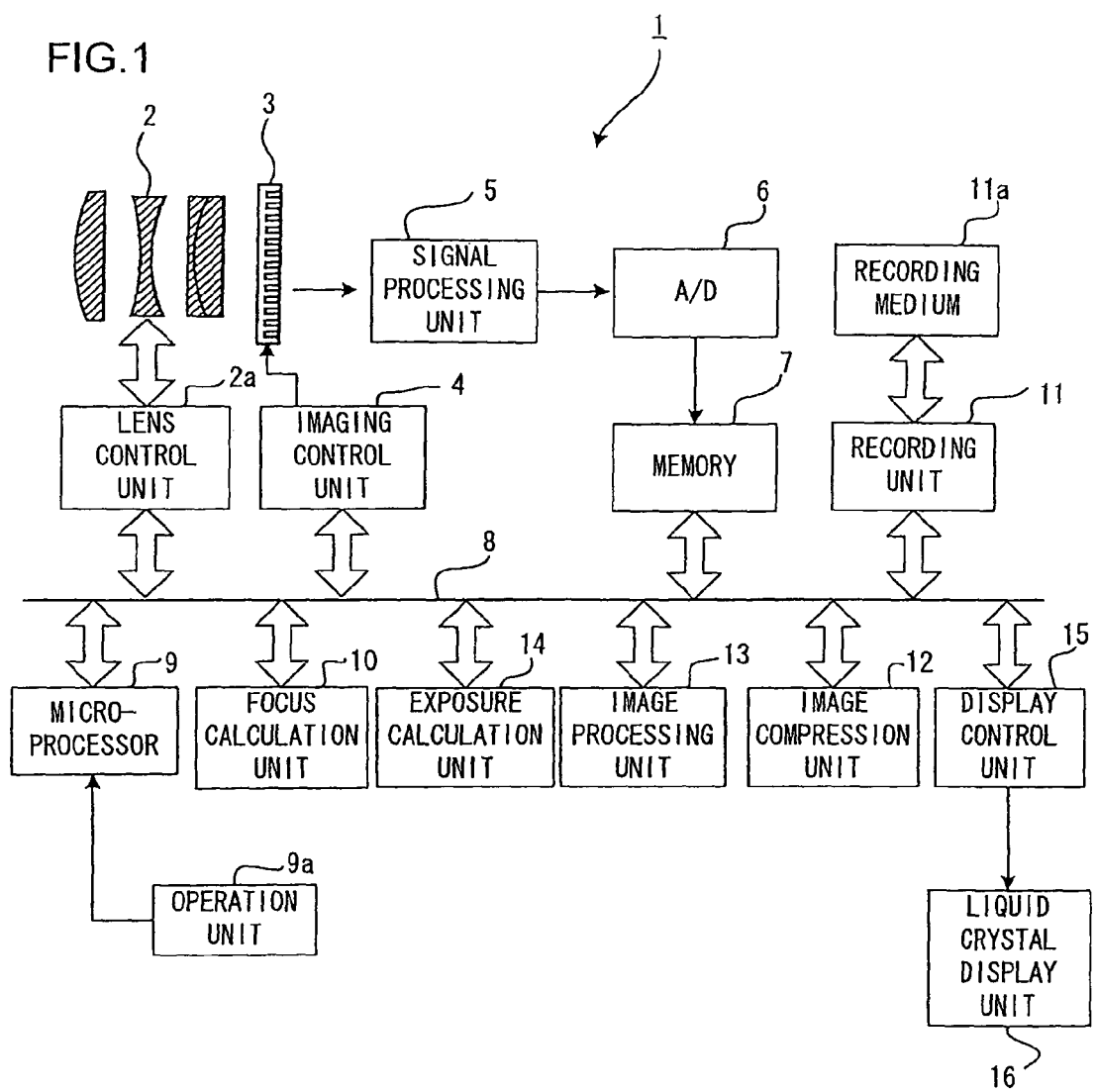
FIG. 1 is a block diagram schematically illustrating the electronic camera according to the present invention.

FIG. 1 is a schematic block diagram of an electronic camera 1 achieved in the first embodiment of the present invention. A photographic lens 2 is mounted at the electronic camera 1. The focus and the aperture of the photographic lens 2 are driven via a lens control unit 2a. An imaging surface of a solid-state image sensor 3 is set within a space where an image is formed via the photographic lens 2.

The solid-state image sensor 3 outputs signals as it is driven in response to a command issued by an imaging control unit 4. The solid-state image sensor 3 outputs imaging signals used to form image signals expressing a subject image and focus detection signals used to detect the focusing condition of the photographic lens 2. Some of the imaging signals may be used as photometry information for automatic exposure. Both types of signals first undergo processing at a signal processing unit 5 and an A/D conversion unit 6 and are then temporarily stored into a memory 7. The memory 7 is connected to a bus 8. The lens control unit 2a, the imaging control unit 4, a microprocessor 9, a focus calculation unit 10, an exposure calculation unit 14, a recording unit 11, an image compression unit 12, an image processing unit 13, a display control unit 15 and the like, too, are connected to the bus 8. The display control unit 15 brings up a live view image or the like at a liquid crystal display unit (LCD) 16. An operation unit 9a such as a shutter release button is connected to the microprocessor 9. In addition, a recording medium 11a is detachably loaded into the recording unit 11. The solid-state image sensor 3, the imaging control unit 4, the signal processing unit 5 and the like together constitute the solid-state imaging device in an embodiment of the present invention.

Figure 2:
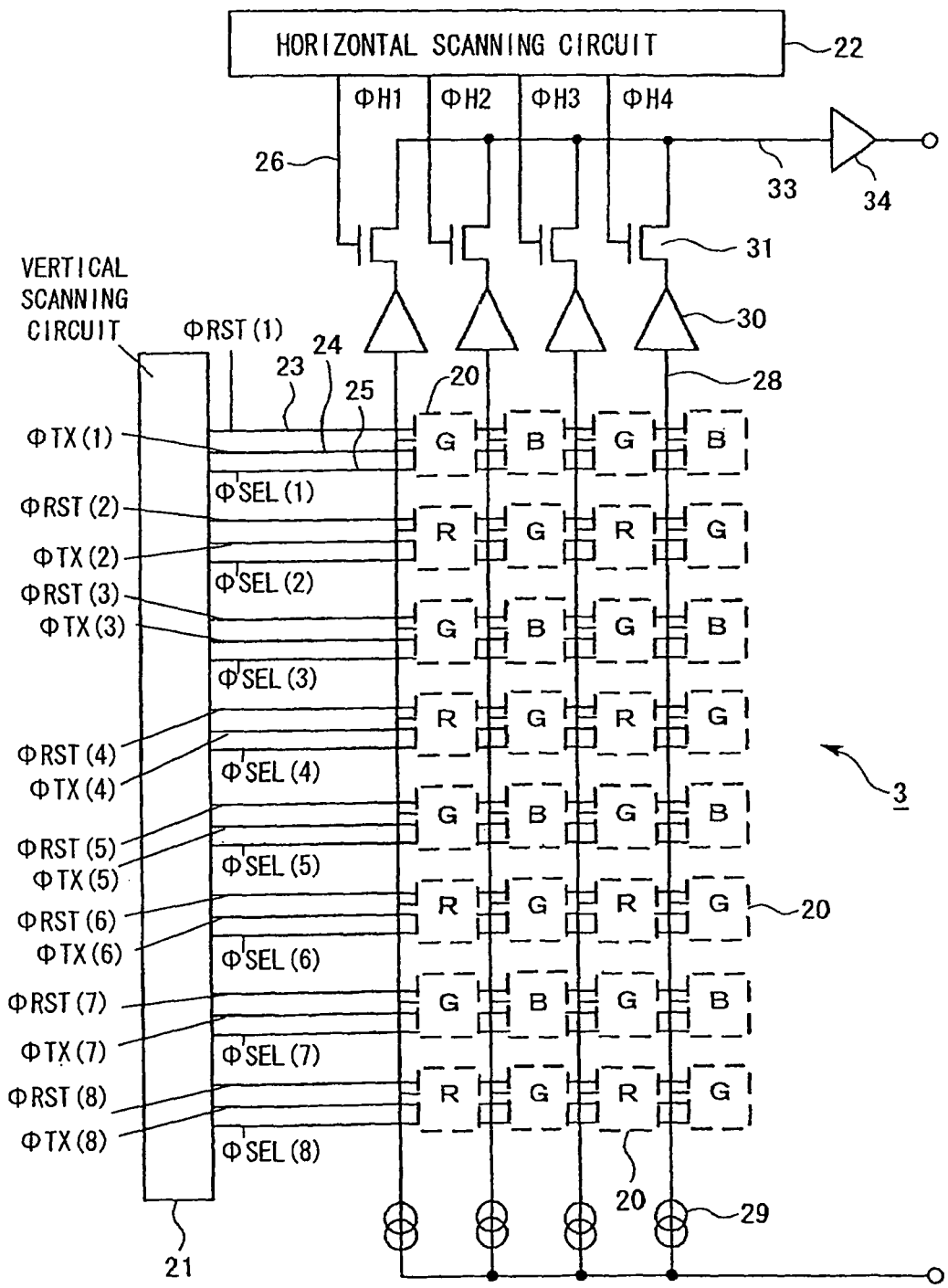
FIG. 2 is a circuit diagram schematically illustrating the structure of the solid-state image sensor achieved in a first embodiment of the present invention.

FIG. 2 is a circuit diagram schematically illustrating the structure of the solid-state image sensor 3 in FIG. 1. The solid-state image sensor 3 includes a plurality of pixels 20 disposed in a two-dimensional matrix pattern and peripheral circuits to which signals from the pixels 20 are output. FIG. 2 shows 32 pixels disposed along four columns set side-by-side in the horizontal direction and along eight rows side-by-side along the vertical direction. Obviously the solid-state image sensor in the embodiment actually includes a great many more than 32 pixels, and the present invention may be adopted in conjunction with any number of pixels.

The solid-state image sensor 3 in the embodiment includes imaging pixels 20e that output imaging signals used to form image signals representing a subject image and focus detection pixels (hereafter may be referred to as "AF pixels") 20a and 20b that output focus detection signals used to detect the focusing condition of the photographic lens 2 through the split-pupil phase difference method. However, the pixels shown in FIG. 2 are all assigned with reference numeral 20, without distinguishing one type of pixel from another. The specific circuit structures and structural features of the various types of pixels are to be described in detail later. A pixel 20 outputs an imaging signal or a focus detection signal in response to a drive signal departing a peripheral circuit. An electronic shutter operation may be executed so that the photoelectric conversion units at all the pixels 20 are simultaneously reset and the pixels 20 are all exposed over equal lengths of time with matching timing, or an electronic shutter operation may be executed through a rolling shutter operation, whereby signals are read out from one row at a time.

The peripheral circuits include a vertical scanning circuit 21, a horizontal scanning circuit 22, drive signal lines 23 through 26 connected to the scanning circuits, vertical signal lines 28 at which signals from the pixels 20 are received, constant current sources 29 and column amplifiers 30 connected to the vertical signal lines 28, switches 31 constituted with transistors, a horizontal signal line 33 at which signals output from the column amplifiers 30 are received via the switches 31, an output amplifier 34 and the like.

It is to be noted that a correlated double-sampling circuit (CDS circuit) is installed in the signal processing unit 5 in FIG. 1 in the embodiment. Thus, signals departing the pixels 20 and output to the outside of the solid-state image sensor 3 via the output amplifier 34 then undergo correlated double sampling processing at the signal processing unit 5. However, it will be obvious that the CDS circuit may instead be installed in the solid-state image sensor 3. A CDS circuit installed in the solid-state image sensor 3 may include the column amplifiers 30.

Figure 3:
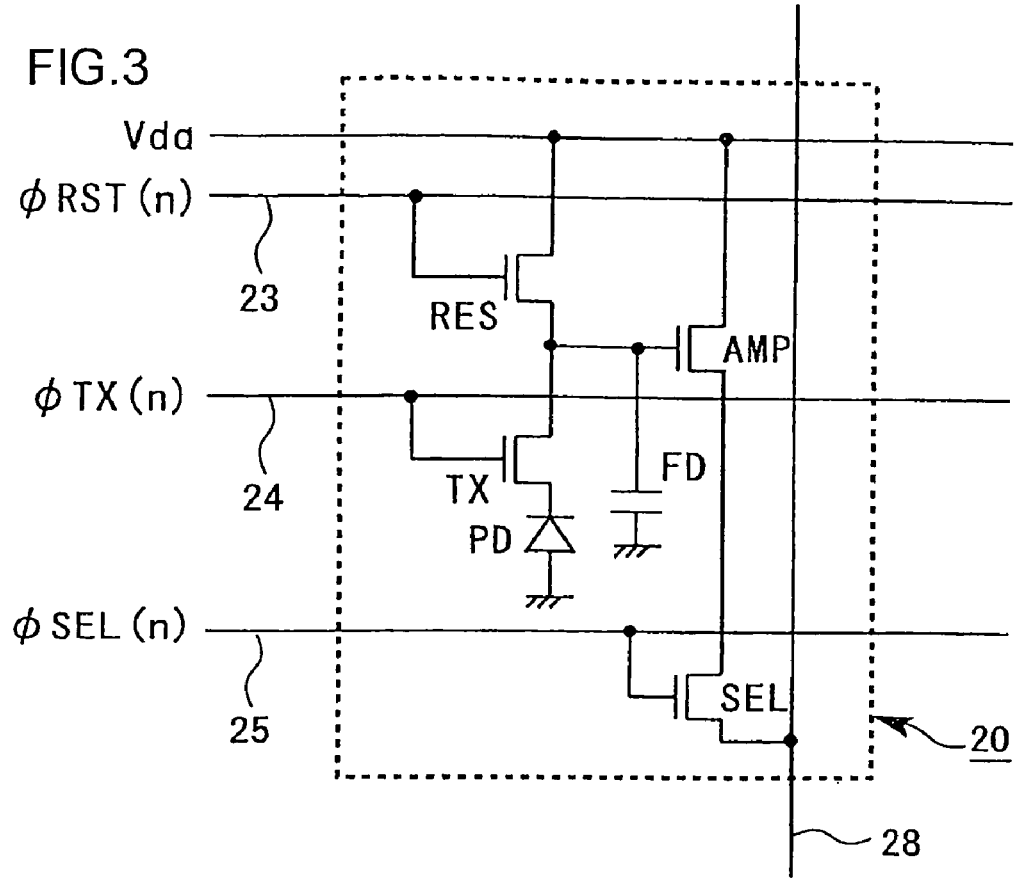
FIG. 3 is a circuit diagram showing the pixels in the solid-state image sensor in the first embodiment of the present invention.

The pixels 20, i.e., the pixels 20a, 20b and 20e all assume identical circuit structures. FIG. 3 is a circuit diagram of a pixel 20 in the solid-state image sensor 3 in FIG. 1.

As do the pixels in a standard CMOS solid-state image sensor, the pixels 20 each include a photodiode PD, a floating diffusion FD, an amplifier transistor AMP, a transfer transistor TX, a reset transistor RES and a selector transistor SEL. The photodiode PD functions as a photoelectric conversion unit that generates and accumulates a signal charge corresponding to the incoming light. The floating diffusion FD functions as a charge/voltage conversion unit that takes in the signal charge accumulated at the photodiode PD and converts the signal charge thus received to a voltage. The amplifier transistor AMP functions as an amplifier unit that outputs a signal corresponding to the potential at the floating diffusion FD. The transfer transistor TX functions as a charge transfer unit that transfers the charge from the photodiode PD to the floating diffusion FD. The reset transistor RES functions as a reset unit that resets the potential at the floating diffusion FD. The selector transistor SEL functions as a selector unit that selects the particular pixel 20. The individual units are connected as illustrated in FIG. 3. It is to be noted that the transistors AMP, TX, RES and SEL at the pixel 20 are each constituted with an nMOS transistor. Vdd in FIG. 3 indicates the source voltage.

The gates of the transfer transistors TX at the pixels in each row are connected to the corresponding control line 24. Through the control line 24, a control signal φTX output from the vertical scanning circuit 21 and used to control the transfer transistors TX, is provided to the transfer transistor TX. The gates of the reset transistors RES at the pixels in each row are connected to the corresponding control line 23. Through the control line 23, a control signal φRST output from the vertical scanning circuit 21 and used to control the reset transistors RES, is provided to the reset transistors RES. The gates of the selector transistors SEL at the pixels in each row are connected to the corresponding control line 25. Through the control line 25, a control signal φSEL output from the vertical scanning circuit 21 and used to control the selector transistors SEL, is provided to the selector transistors SEL.

The photodiode PD generates a signal charge in correspondence to the amount of incoming light (subject light) entering therein. The transfer transistor TX remains in an ON state while the transfer pulse (control signal) φTX sustains a high level, so as to transfer the signal charge accumulated at the photodiode PD to the floating diffusion FD. The reset transistor RES remains on while the reset pulse (control signal) φRST sustains a high level so as to reset the floating diffusion FD.

The amplifier transistor AMP, with its drain connected to the source voltage Vdd, its gate connected to the floating diffusion FD and its source connected to the drain of the selector transistor SEL, forms a source follower circuit that uses the constant current source 29 as its load. The amplifier transistor AMP outputs a read current corresponding to the value of the voltage at the floating diffusion FD, to the corresponding vertical signal line 28 via the selector transistor SEL. The selector transistor SEL remains on while the selection pulse (control signal) φSEL sustains a high level, so as to connect the source of the amplifier transistor AMP to the vertical signal line 28.

In response to a drive pulse (not shown) provided from the imaging control unit 4, the vertical scanning circuit 21 outputs the selection pulse φSEL, the reset pulse φRST and the transfer pulse φTX to each row of pixels 20. The horizontal scanning circuit 22 outputs control signals φH1~φH4 in response to a drive pulse (not shown) provided from the imaging control unit 4.

Figure 4:
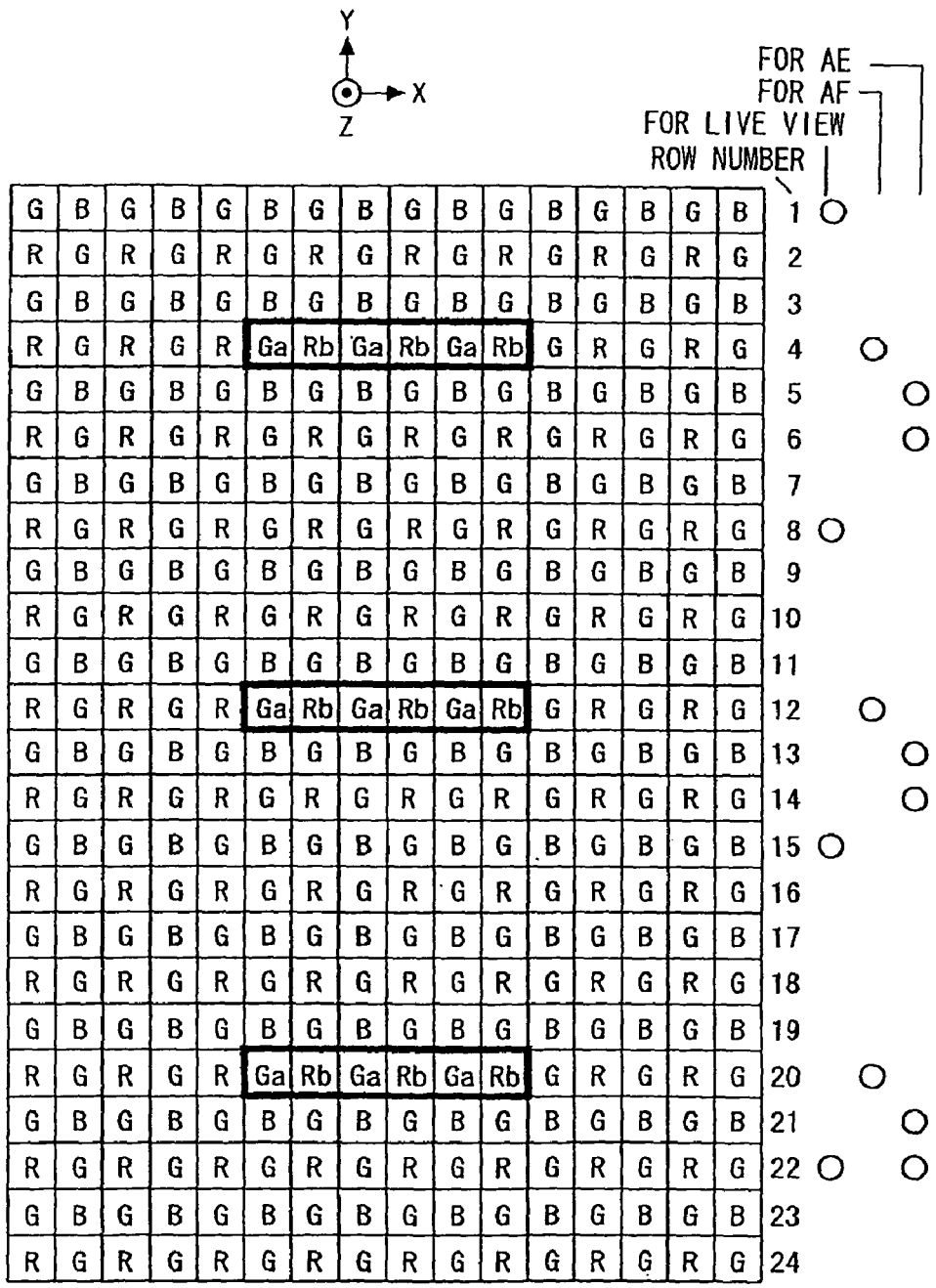
FIG. 4 is a schematic plan view of the effective pixel area of the solid-state image sensor in the first embodiment of the present invention.

FIG. 4 is a schematic plan view showing the effective pixel area of the solid-state image sensor 3 in FIG. 1. For purposes of simplification, it is assumed that the effective pixel area contains 24×16 pixels 20, as shown in FIG. 4. Focus detection areas are enclosed within bold lines in FIG. 4. As FIG. 4 indicates, the effective pixel area at the solid-state image sensor 3 in the embodiment includes three focus detection areas, each ranging along the left/right direction, set at an upper position, a lower position and a middle position. It is to be noted that an X-axis, a Y-axis and a Z-axis extending perpendicular to one another are defined with regard to the effective pixel area at the solid-state image sensor 3, as shown in FIG. 4. A plane ranging parallel to the XY plane is aligned with the imaging surface (light-receiving surface) of the solid-state image sensor 3. The pixels 20 are set side-by-side in rows that extend along the X-axis and in columns that extend along the Y-axis. It is to be noted that the incoming light enters from above the drawing sheet on which FIG. 4 is drawn and advances downward into the figure. This arrangement also applies to later drawings.

Color filters disposed in a Bayer array are each mounted at one of the pixels 20 in the embodiment. The colors of the color filters disposed at the pixels are indicated as R, G and B in FIG. 4. R indicates red, G indicates green and B indicates blue. In addition, the pixels at the solid-state image sensor 3 are categorized into one type of imaging pixels 20e and two types of AF pixels 20a and 20b, without using the colors of the color filters at the pixels as a determining factor. The AF pixels 20a and 20b are respectively appended with letters a and b in FIG. 4. The imaging pixels 20e, on the other hand, are not appended with a letter a or b. Accordingly, "R" in FIG. 4 indicates an imaging pixel 20e having a red color filter mounted thereat, whereas "Ga" in FIG. 4 indicates an AF pixel 20a having a green color filter mounted thereat.

FIG. 5A is a schematic plan view of the essential part of an imaging pixel 20e, whereas FIG. 5B is a schematic sectional view taken along line X1-X2 in FIG. 5A. The imaging pixel 20e includes the photodiode PD functioning as the photoelectric conversion unit, a micro-lens 42 disposed through on-chip formation over the photodiode PD and a color filter 50 in R (red), G (green) or B (blue), which is disposed on the side where the light enters the photodiode PD. In addition, as shown in FIG. 5B, a light shield layer 43, constituted with a metal layer or the like, is formed substantially over the focal plane of the micro-lens 42. The light shield layer 43 may also function as a wiring layer. A square opening 43a, centered on an optical axis O of the micro-lens 42, is formed at the light shield layer 43 of the imaging pixel 20e. The photodiode PD of the imaging pixel 20e assumes a size that allows it to effectively receive all the light having passed through the opening 43a. It is to be noted that an inter-layer insulating film and the like are formed between the light shield layer 43 and the micro-lens 42 and between a substrate 44 and the light shield layer 43.

The imaging pixel 20e in the embodiment includes the light shield layer 43 disposed substantially at the focal plane of the micro-lens 42, with the opening 43a formed at the light shield layer 43. Thus, a light flux departing an area of the exit pupil of the photographic lens 2, which is not offset from the center of the exit pupil (departing an area corresponding to the image of the opening 43a projected via the micro-lens 42) is received and undergoes photoelectric conversion at the photodiode PD of the imaging pixel 20e.

FIG. 6A is a schematic plan view of the essential part of an AF pixel 20a, whereas FIG. 6B is a schematic sectional view taken along line X3-X4 in FIG. 6A. In FIGS. 6A and 6B, the same reference numerals are assigned to elements identical to or corresponding to elements shown in FIGS. 5A and 5B. The elements assigned with the same reference numerals to those in FIGS. 5A and 5B are not repeatedly explained. This principle also applies in the description of FIGS. 7A and 7B.

The AF pixel 20a differs from the imaging pixel 20e in that a rectangular opening 43b ranging over an area that matches the right half (on the +X side) of a square centering on the optical axis O of the micro-lens 42 (a square with the size equal to that of the opening 43a) is formed at the light shield layer 43 of the AF pixel 20a. It is to be noted that the size of the photodiode PD at the AF pixel 20a is the same as the size of the photodiode PD at the imaging pixel 20e. While the opening 43b ranges over an area half the area of the opening 43a in the embodiment described above, the present invention is not limited to this example. For instance, the opening 43b may be a rectangular opening ranging over an area accounting for approximately 40% or 60% of the right half (the +X side) of the square centering on the optical axis O of the micro-lens 42 of the AF pixel 20a (the square ranging over the area equal to the area of the opening 43a). It is desirable that the opening 43b at the AF pixel 20a range over an area equal to the area of an opening 43c at the AF pixel 20b to be described in detail later.

The opening 43b is formed at the light shield layer 43 of the AF pixel 20a. Thus, a light flux departing an area of the exit pupil offset along the −X direction relative to the center of the exit pupil of the photographic lens 2 is selectively received and undergoes photoelectric conversion at the photodiode PD of the AF pixel 20a.

Figure 7A:
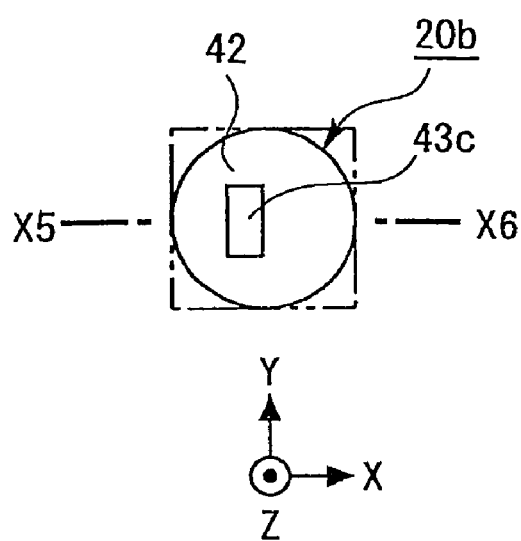
FIGS. 7A and 7B schematically illustrate the essential part of another AF pixel.
Figure 7B:
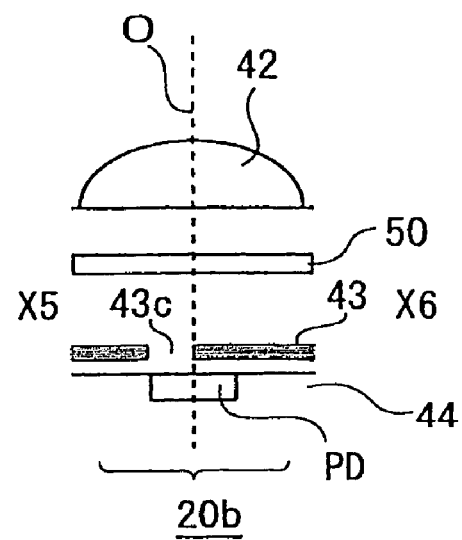

FIG. 7A is a schematic plan view of the essential part of an AF pixel 20b, whereas FIG. 7B is a schematic sectional view taken along line X5-X6 in FIG. 7A. The AF pixel 20b differs from the imaging pixel 20e in that a rectangular opening 43c ranging over an area that matches the left half (on the −X side) of a square centering on the optical axis O of the micro-lens 42 (a square with the size equal to that of the opening 43a) is formed at the light shield layer 43 of the AF pixel 20b. Thus, a light flux departing an area of the exit pupil offset along the +X direction relative to the center of the exit pupil of the photographic lens 2 is selectively received and undergoes photoelectric conversion at the photodiode PD of the AF pixel 20b.

It is to be noted that the color filters 50 do not need to be disposed in a Bayer array. In addition, it is not strictly necessary to dispose color filters 50 at the AF pixels 20a and 20b even when the solid-state image sensor 3 is configured as a color image sensor.

Figure 8:
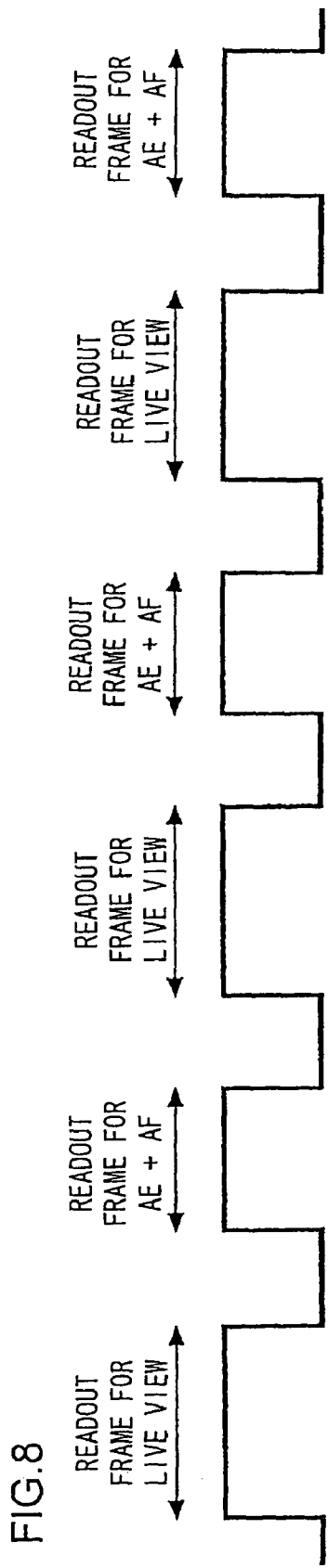
FIG. 8 is a timing chart schematically illustrating the signal read conditions under which signals are read from the solid-state image sensor while the electronic camera in the first embodiment of the present invention is set in a specific operation mode.

FIG. 8 presents a timing chart schematically illustrating the signal read conditions under which signals are read from the solid-state image sensor 3 in the electronic camera 1 set in a specific operation mode in the embodiment. The electronic camera 1 alternately performs a readout frame for live view and a readout frame for AF+AE in sequential cycles, as shown in FIG. 8. During the readout frame for live view, the solid-state image sensor 3 is engaged in operation in a live view read mode in which imaging signals to be used for live view display are read out from the solid-state image sensor 3. During the readout frame for AF+AE, the solid-state image sensor 3 is engaged in operation in a focus detection and automatic exposure read mode (may also be referred to as an "AF+AE read mode") in which focus detection signals and imaging signals to be used as photometry information for automatic exposure are read out from the solid-state image sensor 3. For instance, the readout frame for live view may be set over approximately 1/40 sec, whereas the readout frame for AF+AE may be set over approximately 1/100 sec. Specific examples of these read modes are described below.

Assuming that the pixels 20 are arranged in a specific array such as that shown in FIG. 4, signals from the pixels 20 are read out through a discriminative read along the columnar direction under control executed by the imaging control unit 4 in the live view read mode. For instance, signals may be read out from the pixels 20 in the rows indicated by the circles on the right side in FIG. 4 by skipping six rows in between. Namely, signals may be read out from the pixels in rows 1, 8, 15 and 22. It is desirable to ensure that an even number of rows that are skipped in the discriminative read, in order to read out signals with the colors represented thereby sustaining a Bayer array sequence. While it is more desirable to read out the signals from the pixels 20 through a discriminative read executed along the columnar direction so as to complete the signal read quickly in the live view read mode, the signals from the pixels 20 in all the rows may be read out instead.

Figure 9:
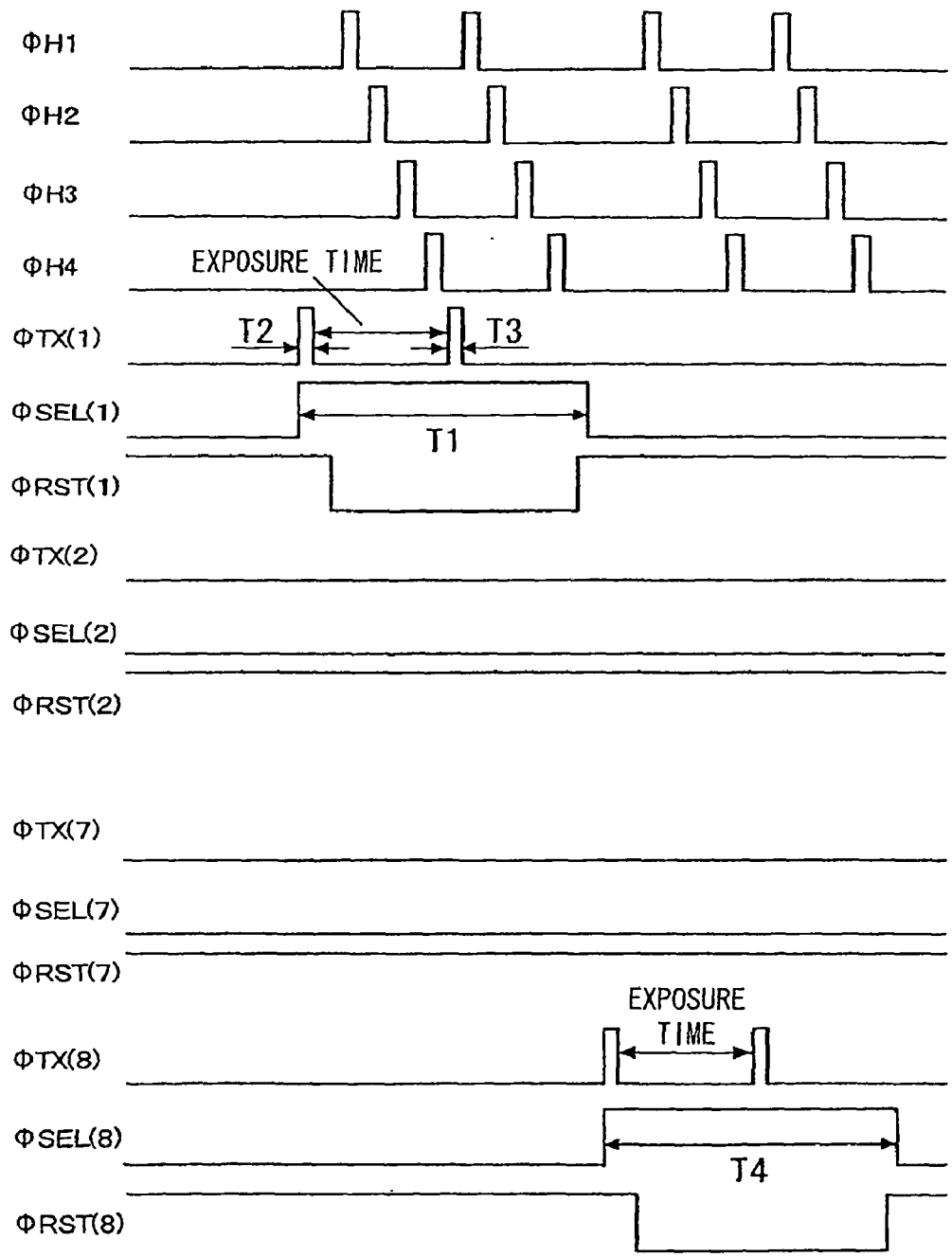
FIG. 9 is a timing chart representing an example of an operation that may be executed while the electronic camera in the first embodiment of the present invention is set in the live view read mode.

FIG. 9 presents a timing chart of control signals that may be output in order to read out the signals from the pixels in row 1, skip the signal read from the pixels in rows 2~7 and read out the signals from the pixels in row 8 in the live view read mode, in the configuration shown in FIG. 2 with 8×4 pixels 20. In the example presented in FIG. 9, the signals are read out from all the pixels present in the read target rows without executing horizontal pixel summing. Moreover, an electronic shutter operation is executed through the rolling shutter method. A period T1 in FIG. 9 is the period of time during which the pixels in row 1 are selected. The pixels in row 1 are exposed during the period of time elapsing between the end point of a period T2 and the start point of a period T3. CDS processing through which the differences between signals read out before the period T3 and signals read out after the period T3 during the period T1 are determined, is executed by the signal processing unit 5 installed outside the solid-state image sensor 3. During a period T4, in which the pixels in row 8 are selected, an operation similar to that executed during the period T1 is executed for the pixels in row 8.

Assuming that the pixels 20 are arrayed as shown in FIG. 4, signals from the pixels in rows 4~6, rows 12~14 and rows 20~22 may be read out in the AF+AE read mode, as indicated by the circles on the right side in FIG. 4, with the signal read from the pixels in the other rows skipped. These read target rows include rows 4, 12 and 20 selected for AF read, which correspond to the three focus detection areas extending along the row direction, rows 5 and 6, 13 and 14, and 21 and 22 selected for AE read. Since the color filters 50 are disposed in the Bayer array, signals are read out from the different-color adjacent pixels in the two rows set side-by-side along the columnar direction are read out as signals are read for the AE read from the pixels in pairs of rows each made up with two successive rows following an even number of rows (6 rows in this example) skipped along the columnar direction. Thus, the extent of false color is reduced compared to cases in which signals are read out from rows that are not successive. Consequently, an advantage is achieved in that automatic exposure control is executed with a higher level of accuracy.

Figure 10:
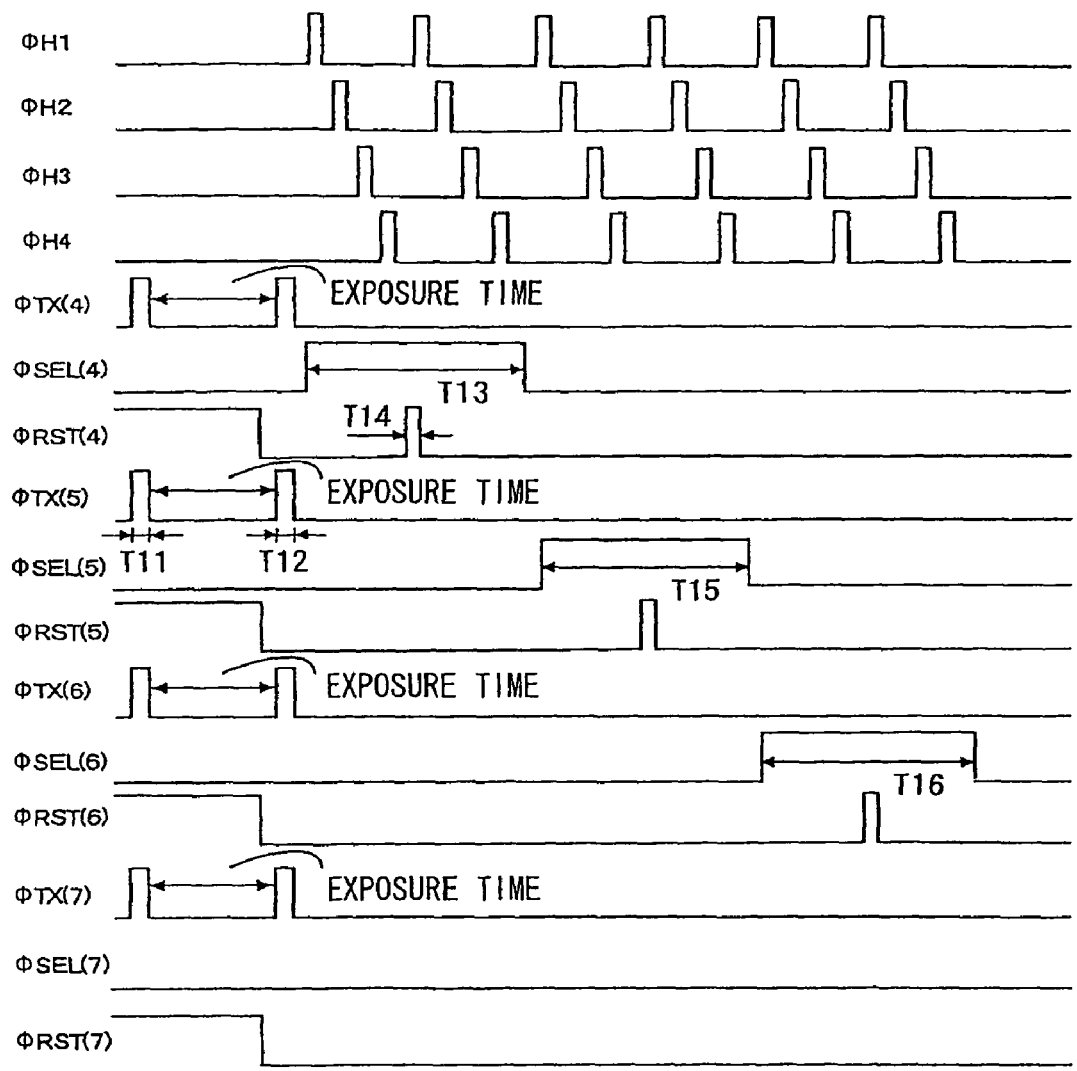
FIG. 10 is a timing chart representing an example of operations that may be executed while the electronic camera in the first embodiment of the present invention is set in the AF+AE read mode.

FIG. 10 presents a timing chart of control signals that may be output in order to skip the read of the signals from the pixels in rows 1~3, read out the signals from the pixels in rows 4~6 and skip the read of the signals from the pixels in row 7 in the AF+AE read mode in the 8×4 pixel configuration in FIG. 2. In this example, an electronic shutter operation is executed so that all the pixels 20 are exposed over a uniform length of time with matching timing. Such an electronic shutter operation differs from the rolling shutter operation in that the signals are read out from the individual AF pixels with no time lag in correspondence to a given frame and in that imaging signals to be used as individual sets of photometry information for automatic exposure are read out with no time lag. As a result, the accuracy of the focus detection and the accuracy of the automatic exposure control can both be greatly improved. It is to be noted that only specific pixels 20 from which valid signals must be read out for purposes of focus detection and exposure amount detection alone may be exposed over a uniform length of time with matching timing, instead.

FIG. 10 indicates that exposure time for all the pixels 20 is determined from the end point of a period T11 to the start point of a period T12. During a period T13, the pixels in row 4 are selected. CDS processing through which the differences between signals read out before the period T14 and signals read out after the period T14 during the period T13 are determined, is executed by the signal processing unit 5 installed outside the solid-state image sensor 3. During this process, the signal component is obtained prior to the period T14, whereas the noise component is obtained following the period T14. Since the reset period T14 elapses between these signal acquisition periods, any noise occurring during the reset period T14 is bound to remain in the signals. However, such noise remaining in the signals does not significantly affect the focus detection accuracy or the exposure amount detection accuracy. During a period T15, in which the pixels in row 5 are selected and during a period T16 in which the pixels in row 6 are selected, operation similar to that executed during the period T13 is executed for the pixels in rows 5 and 6 respectively.

In the electronic camera 1 achieved in the embodiment set in the operation mode in which the readout frame for live view and the readout frame for AF+AE are repeated alternately, as explained above in reference to FIG. 8, the imaging signals read out for each readout frame for live view are output to the display control unit 15 via the signal processing unit 5, the A/D conversion unit 6 and the memory 7. Based upon the imaging signals, a live view image is brought up on display at the liquid crystal display unit 16 under control executed by the display control unit 15. In addition, in the operation mode shown in FIG. 8, the AF signals read out for each readout frame for AF+AE are output to the focus calculation unit 10 via the signal processing unit 5, the A/D conversion unit 6 and the memory 7. Based upon the AF signals, the focus calculation unit 10 calculates a defocus amount through the split-pupil phase difference method and autofocus is executed via the lens control unit 2a driving the photographic lens 2 in correspondence to the defocus amount so as to achieve the focus match state. In the operation mode shown in FIG. 8, the AE signals read out for each readout frame for AF+AE are output to the exposure calculation unit 14 via the signal processing unit 5, the A/D conversion unit 6 and the memory 7. Based upon the AE signals, the exposure calculation unit 14 calculates the optimal exposure amount, the lens control unit 2a adjusts the aperture of the photographic lens 2 so as to achieve an exposure amount corresponding to the exposure amount determined via the exposure calculation unit 14 and the imaging control unit 4 sets a shutter speed corresponding to the exposure amount.

As described above, while the live view image is displayed at the liquid crystal display unit 16 based upon signals read out in the live view read mode, autofocus is executed for the photographic lens 2 through the split-pupil phase difference method based upon signals read out in the AF+AE read mode and automatic exposure control is executed based upon signals read out in the AF+AE read mode at the electronic camera 1 achieved in the embodiment. The user is thus able to view an in-focus live view display image with optimal exposure. In addition, since AF control is executed through the split-pupil phase difference method while the live view image is on display in the embodiment, even a subject present within a relatively short range and moving at a relatively high speed can be displayed in the live view display in the focus match state on the subject. This feature is bound to greatly increase user convenience.

Furthermore, in the AF+AE read mode, the AF signals and the AE signals are read out in correspondence to a single frame, and thus, the signal read can be completed faster in the embodiment over a signal read through which the AF signals and the AE signals are read out in correspondence to different frames. Ultimately, the AF control and the AE control can be executed even faster.

The operation mode in FIG. 8 may be started up in response to, for instance, a halfway press operation of the shutter release button at the operation unit 9a performed by the user after setting the electronic camera 1 in the photographing mode. Then, as the shutter release button is pressed all the way down, the main photographing operation may be executed. Since the focus match state and the optimal exposure state are achieved prior to the full press operation, the shutter can be pressed immediately without missing any good photo opportunity. It is to be noted that during the main photographing operation, the imaging signals are readout from the pixels in all the rows instead of reading out signals through a discriminative read in, for instance, the live view read mode described herein. The imaging signals thus read out are then stored into the memory 7 via the imaging control unit 4. Subsequently, in response to a command issued via the operation unit 9a, the microprocessor 9 engages the image processing unit 13 and the image compression unit 12 in specific types of processing and the signals having undergone the processing are output from the recording unit 11 to the recording medium 11a to be recorded into the recording medium 11a. It is to be noted that the operation mode shown in FIG. 8 may be started up simply by setting the electronic camera in the photographing mode, instead of in response to the halfway press operation of the shutter release button.

It is to be noted that when photographing an image by, for instance, looking through an optical viewfinder without bringing up the live view display, the AF control and the AE control may be executed in the AF+AE read mode set in response to, for instance, a halfway press operation of the shutter release button at the operation unit 9a. In this case, too, the AF signals and the AE signals are read out for a single frame in the AF+AE read mode, achieving the advantage of both AF control and AE control executed at higher speed.

Second Embodiment

Figure 11:
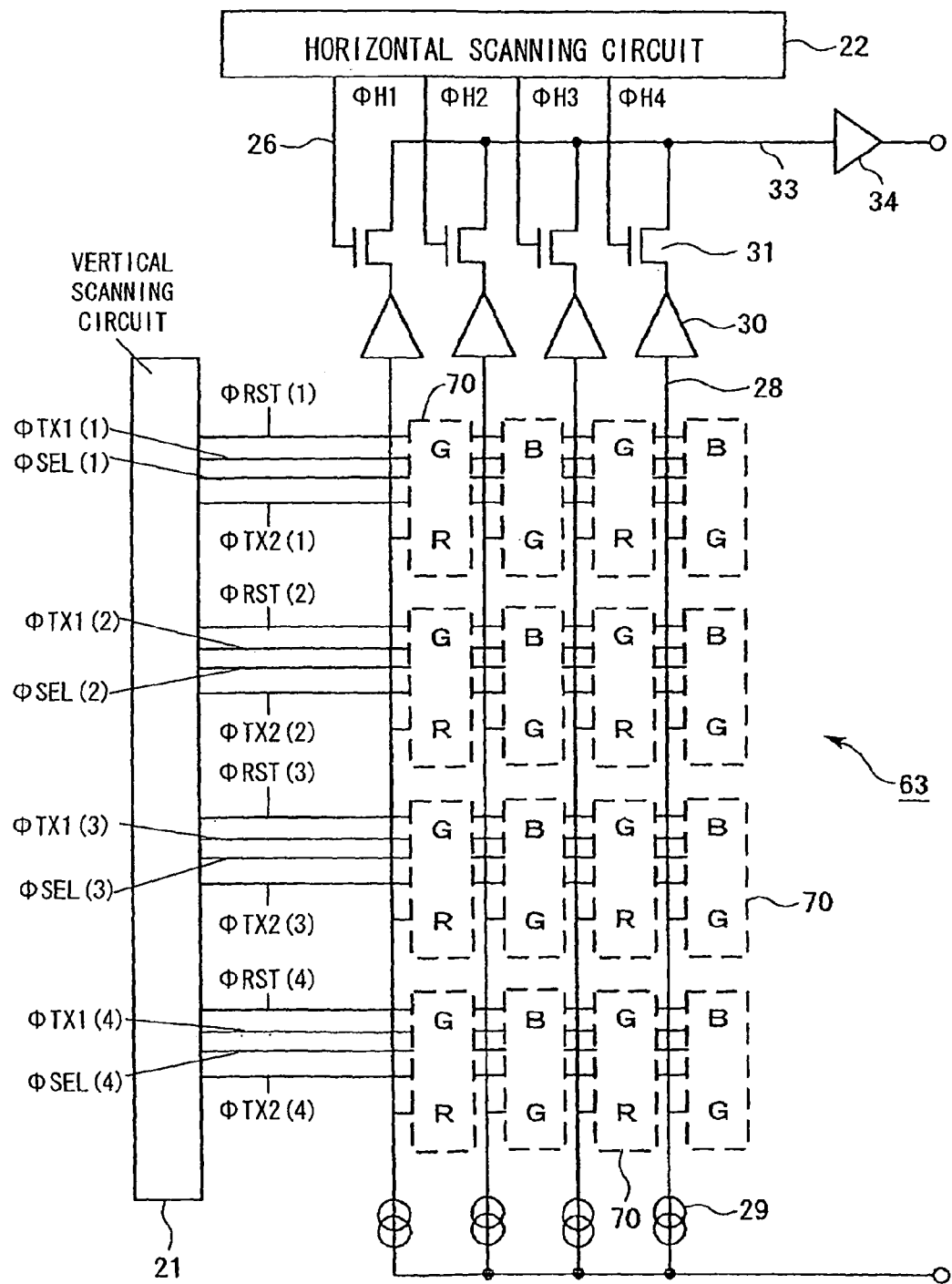
FIG. 11 is a circuit diagram of the solid-state image sensor in the electronic camera achieved in a second embodiment of the present invention.
Figure 12:
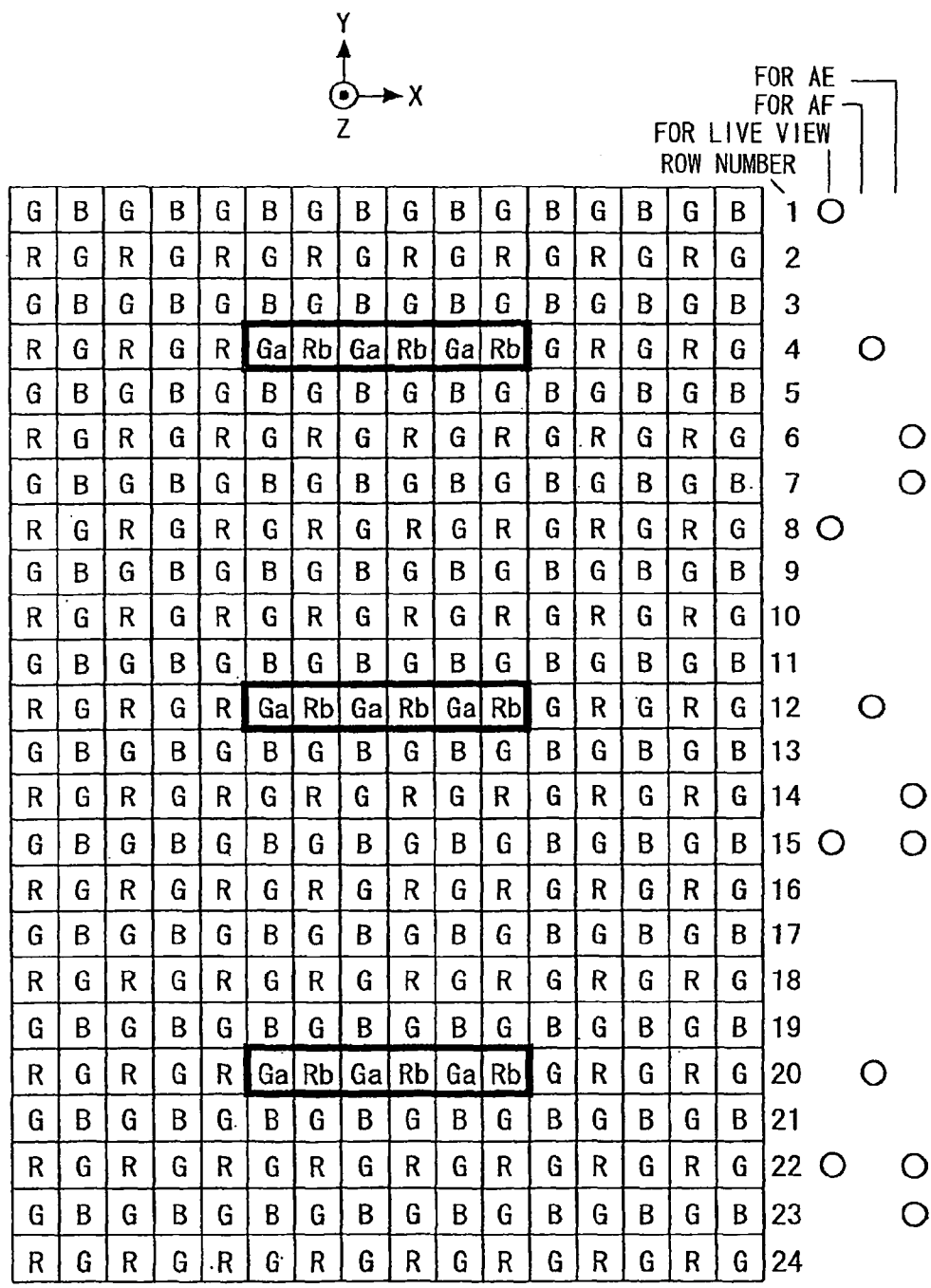
FIG. 12 is a schematic plan view showing the effective pixel area of the solid-state image sensor in the second embodiment of the present invention.
Figure 13:
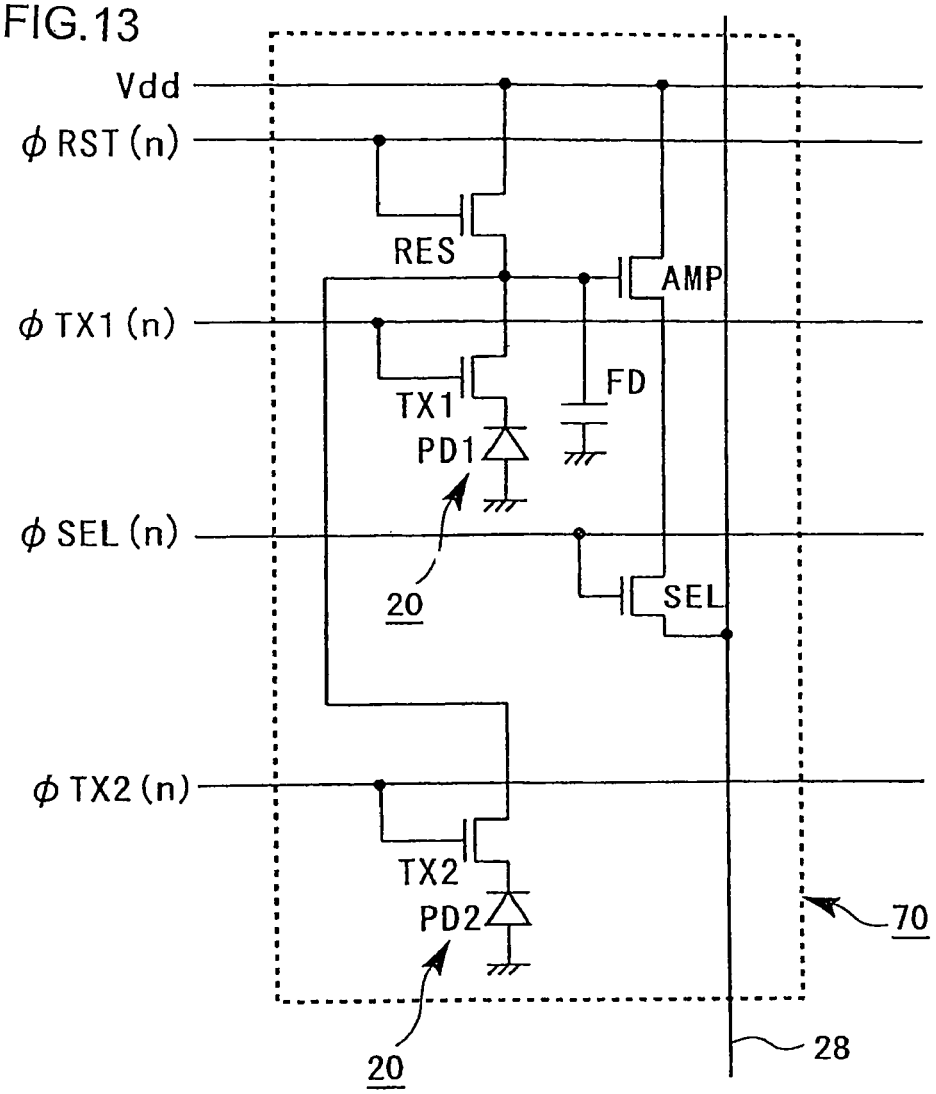
FIG. 13 is a circuit diagram of a pixel block at the solid-state image sensor in the second embodiment of the present invention.

FIG. 11 is a circuit diagram similar to that in FIG. 2, showing a solid-state image sensor 63 in the electronic camera achieved in the second embodiment of the present invention. As does FIG. 2, FIG. 11 shows 8×4 pixels 20 (4×4 pixel blocks 70). FIG. 12 is a schematic plan view, similar to FIG. 4, showing the effective pixel area at the solid-state image sensor 63 in FIG. 11. FIG. 13 is a circuit diagram of one of the pixel blocks 70 at the solid-state image sensor 63 in FIG. 11. In FIGS. 11 through 13, the same reference numerals are assigned to elements identical to or corresponding to those in FIGS. 2 through 4, so as to preclude the necessity for a repeated explanation thereof.

The following features differentiate the current embodiment from the first embodiment. Namely, the pixels in each pair of pixels set adjacent to each other along the columnar direction at the solid-state image sensor 63, share a single set consisting of a floating diffusion FD, an amplifier transistor AMP, a reset transistor RES and a selector transistor SEL. FIGS. 11 and 13 show pixel blocks 70 each constituted with two pixels 20 sharing the set consisting of the floating diffusion FD, the amplifier transistor AMP, the reset transistor RES and the selector transistor SEL. In FIG. 13, the photodiode PD and the transfer transistor TX belonging to the upper pixel 20 within the pixel blocks 70 are respectively indicated as PD1 and TX1 and the photodiode PD and the transfer transistor TX belonging to the lower pixel 20 in the pixel blocks 70 are respectively indicated as PD2 and TX2, so as to distinguish them from each other. In addition, the control signal provided to the gate electrode of the transfer transistor TX1 is indicated as φTX1 and the control signal provided to the gate electrode of the transfer transistor TX2 is indicated as φTX2 so as to distinguish them from each other. It is to be noted that while "n" indicates a specific row of pixels 20 in FIGS. 2 and 3, "n" in FIGS. 11 and 13 indicates a specific row of pixel blocks 70. For instance, pixel blocks 70 in row 1 are each made up with a pixel 20 in row 1 and a pixel 20 in row 2, whereas pixel blocks 70 in row 2 are each made up with a pixel 20 in row 3 and a pixel 20 in row 4.

The schematic plan view of the effective pixel area at the solid-state image sensor 63 in the embodiment, shown in FIG. 12 is similar to that in FIG. 4. The specific pixel rows from which the signals are read out in the various read modes at this solid-state image sensor 63 are indicated by the circles. However, unlike at the solid-state image sensor in FIG. 4, AE signals are read out from the pixels in rows 6 and 7, rows 14 and 15 and rows 22 and 23 in the AF+AE read mode in the embodiment, so as to avoid reading out the signals from two rows where pixels belonging to the same pixel blocks 70 are present and enable an electronic shutter operation during which the read-target pixels are exposed over a uniform length of time with matching timing, as explained in detail in reference to FIG. 15.

It is to be noted that as in the first embodiment, the readout frame for live view and the readout frame for AF+AE are repeated alternately in the specific operation mode in the embodiment, as shown in FIG. 8.

Figure 14:
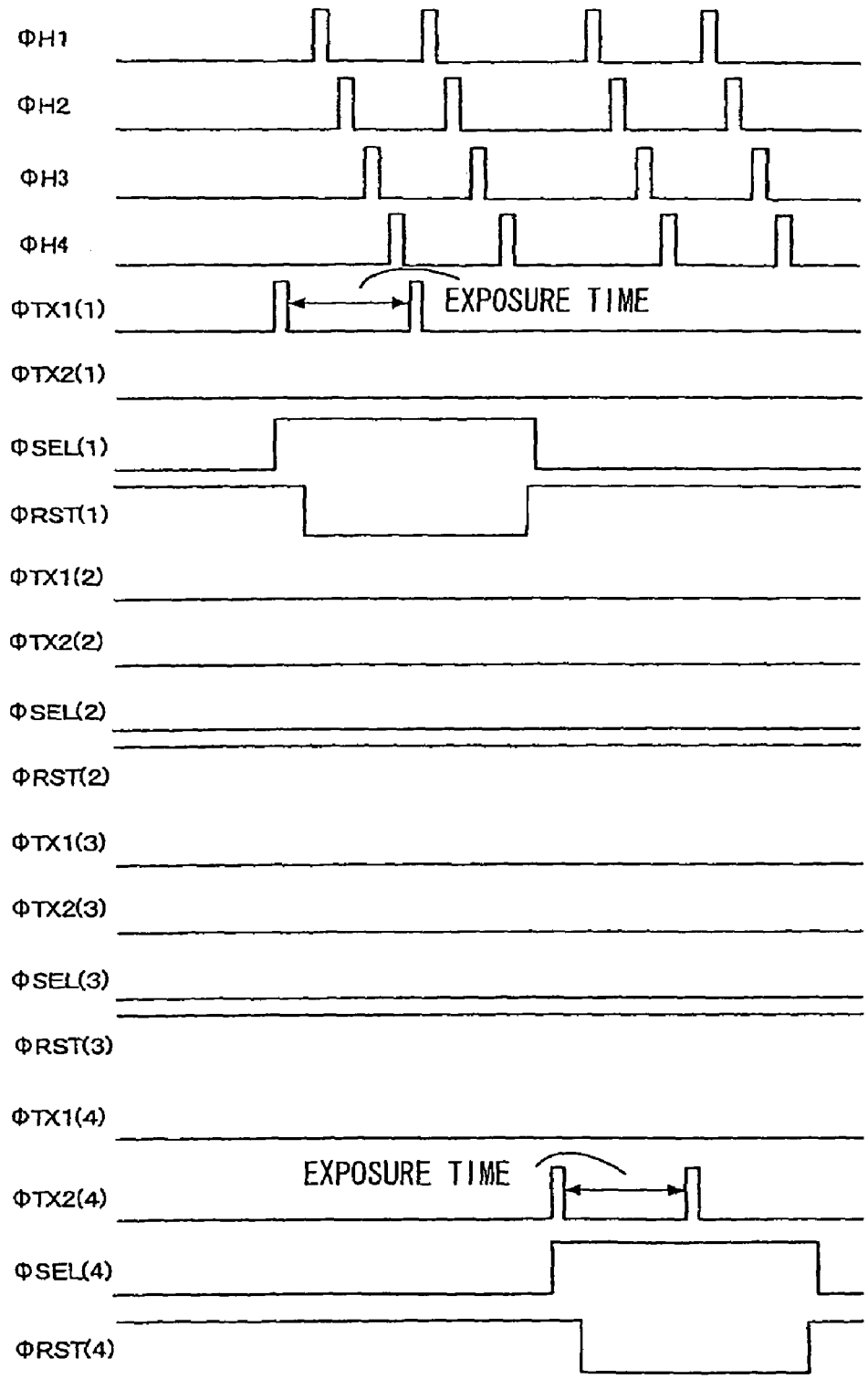
FIG. 14 is a timing chart representing an example of operations that may be executed while the electronic camera in the second embodiment of the present invention is set in the live view read mode.

FIG. 14 presents a timing chart similar to that in FIG. 9, showing control signals that may be output in order to read out the signals from the pixels in row 1 (from the upper pixels in the pixel blocks 70 in row 1), skip the signal read from the pixels in rows 2~7 (skip the signal read from the lower pixels in the pixel blocks 70 in row 1 through the upper pixels in the pixel blocks 70 in row 4) in the live view read mode and read out the signals from the pixels in row 8 (the lower pixels in the pixel blocks 70 in row 4), in the configuration shown in FIG. 11 with 8×4 pixels 20 (4×4 pixel blocks 70). In this example, too, an electronic shutter operation is executed through the rolling shutter method.

Figure 15:
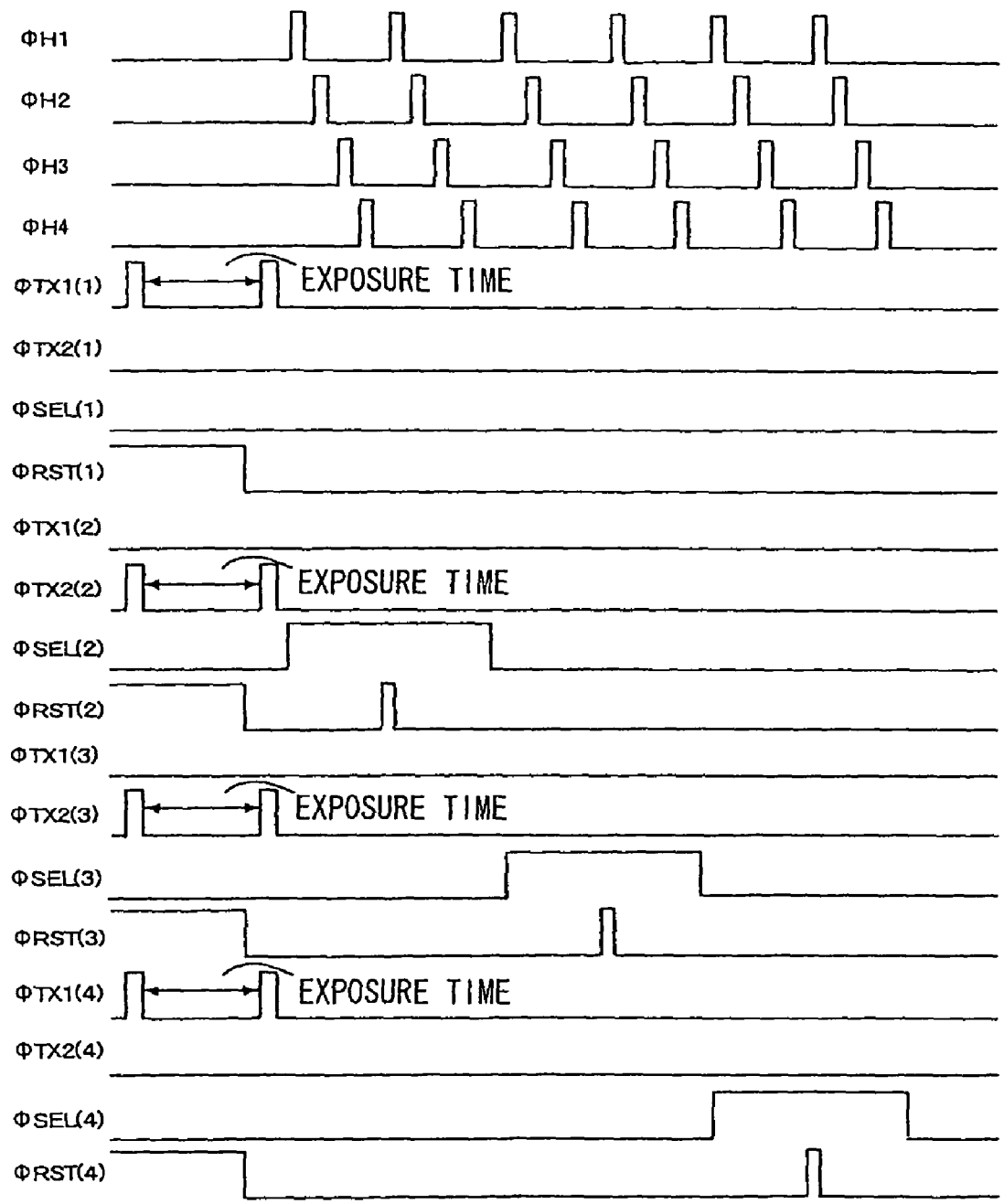
FIG. 15 is a timing chart representing an example of operations that may be executed while the electronic camera in the second embodiment of the present invention is set in the AF+AE read mode.

FIG. 15 presents a timing chart, distinct from that presented in FIG. 10, of control signals that may be output in order to skip the read of the signals from the pixels in rows 1~3 (skip the read of the signals from the upper pixels in the pixel blocks 70 in row 1 through the upper pixels in the pixel blocks 70 in row 2), read out the signals from the pixels in row 4 (from the lower pixels in the pixel blocks 70 in row 2), skip the read of the signals from the pixels in row 5 (the upper pixels in the pixel blocks 70 in row 3), read out the signals from the pixels in rows 6 and 7 (read out the signals from the lower pixels in the pixel blocks 70 in row 3 and the upper pixels in the pixel blocks 70 in row 4) and skip the signal read from the pixels in row 8 (the lower pixels in the pixel blocks 70 in row 4) in the AF+AE read mode in the configuration shown in FIG. 11 with the 8×4 pixels 20 (4×4 pixel blocks 70). In this example, too, an electronic shutter operation is executed so that the read-target pixels 20 are all exposed over a uniform length of time with matching timing.

Advantages similar to those of the first embodiment described earlier are achieved through the current embodiment. In addition, since a set of a floating diffusion FD, an amplifier transistor AMP, a reset transistor RES and a selector transistor SEL is shared by each two pixels 20, the number of transistors to be provided in correspondence to each pixel is reduced and thus, the aperture ratio can be increased by adopting the embodiment.

It is to be noted that in the structure that includes pixel blocks 70 each made up with L (L is an integer equal to or greater than 2, L=2 in the embodiment) pixels 20 the photoelectric conversion units (photodiodes) of which are set side-by-side in sequence along the columnar direction with each pixel blocks 70 equipped with a common set of a floating diffusion FD, an amplifier transistor AMP, a reset transistor RES and a selector transistor SEL shared by the L pixels 20 belonging to the pixel block 70, as in the embodiment, the following conditions should be satisfied. Namely, (i) signals from imaging pixels present in two successive rows should be read out as AE signals after each interval corresponding to M rows (M is an even number) skipped along the columnar direction in the AF+AE read mode and (ii) M={L×(2+N)−2} (N is an integer equal to or greater than 0). Under condition (i) described above, the signals read out from the pixels present in the two rows adjacent to each other along the columnar direction represent different colors and thus, the extent of false color is reduced compared to a condition under which signals are read out from discrete rows. As a result, the automatic exposure control can be executed more accurately. In addition, under condition (ii) described above, the rows of pixels from which the signals are to be read out are exposed over a uniform length of time with matching timing while the pixels in each pixel blocks 70 share a single set of a floating diffusion FD, an amplifier transistor AMP and the like. In such an electronic shutter operation, the AF signals are read out with no time lag in a given frame and imaging signals to be used as individual sets of photometry information for automatic exposure are read out with no time lag. As a result, the accuracy of the focus detection and the accuracy of the automatic exposure control can both be greatly improved.

As examples in which the conditions outlined above are satisfied, FIG. 16 representing an example of rows from which AE signals are read out with L, N and M respectively set to 2, 0 and 2, FIG. 17 representing an example of rows from which AE signals are read out with L, N and M respectively set to 2, 2 and 6 and FIG. 18 representing an example of rows from which AE signals are read out with L, N and M respectively set to 2, 4 and 10. It is to be noted that pixels in the individual rows assume colors G and R in the Bayer array in FIGS. 16 through 18. As long as condition (ii) is satisfied, L, N and M may assume values other than those indicated above. For instance, L, N and M may be set to 2, 12 and 26 respectively. In addition, when L=4, M may assume one of the following values; 6, 10, 14 and 18. When L=6, M may assume one of the following values; 10, 16, 22 and 28.

Third Embodiment

FIG. 19 presents a timing chart schematically illustrating the signal read conditions under which signals are read from the solid-state image sensor 3 in the electronic camera set in a specific operation mode in the third embodiment.

The electronic camera in the embodiment differs from the electronic camera 1 described earlier in reference to the first embodiment in that the operation shown in FIG. 19, instead of that shown in FIG. 8, is executed in the specific operation mode.

When the specific operation mode is selected in the electronic camera achieved in the embodiment, a readout frame for live view+AF+AE is repeated, as shown in FIG. 19. During the readout frame for live view+AF+AE, the solid-state image sensor 3 is engaged in operation in a batch read mode (may also be referred to as a "live view+AF+AE read mode") in which imaging signals to be used for the live view display, focus detection signals and imaging signals to be used as photometry information for automatic exposure are read out from the solid-state image sensor 3.

Assuming that the pixels 20 are disposed as shown in FIG. 4, signals are read out from the pixels 20 through a discriminative read executed along the columnar direction under control executed by the imaging control unit 4. For instance, the signals may be read out from the pixels in row 1, the signal read from the pixels in rows 2 and 3 may be skipped, the signals may be read out from the pixels in rows 4 through 6, the signal read from the pixels in row 7 may be skipped, the signals may be read out from the pixels in row 8, the signal read from the pixels in rows 9 through 11 may be skipped, the signals may be read out from the pixels in rows 12 through 15, the signal read from the pixels in rows 16 through 19 may be skipped, the signals may be read out from the pixels in rows 20 through 22 and the signal read from the pixels in rows 23 and 24 may be skipped, so as to read out the signals from pixels in all the rows marked with the circles on the right side in FIG. 4. Such a read operation may be executed in conformance to the timing chart presented in FIG. 9.

At the electronic camera 1 in the embodiment set in the operation mode in which the readout frame for live view+AF+AE is repeated as has been described in reference to FIG. 19, the imaging signals to be used for the live view display, read out in correspondence to each readout frame for live view+AF+AE, are output to the display control unit 15 via the signal processing unit 5, the A/D conversion unit 6 and the memory 7. Based upon the imaging signals, a live view image is brought up on display at the liquid crystal display unit 16 under control executed by the display control unit 15. In addition, in the operation mode shown in FIG. 19, the AF signals read out in correspondence to each readout frame for live view+AF+AE are output to the focus calculation unit 10 via the signal processing unit 5, the A/D conversion unit 6 and the memory 7.

Based upon the AF signals, the focus calculation unit 10 calculates the defocus amount through the split-pupil phase difference method and autofocus is executed via the lens control unit 2a driving the photographic lens 2 in correspondence to the defocus amount so as to achieve the focus match state. In the operation mode shown in FIG. 19, the AE signals read out for each readout frame for live view+AF+AE are output to the exposure calculation unit 14 via the signal processing unit 5, the A/D conversion unit 6 and the memory 7.

Based upon the AE signals, the exposure calculation unit 14 calculates the optimal exposure amount, the lens control unit 2a adjusts the aperture of the photographic lens 2 so as to achieve an exposure amount corresponding to the exposure amount determined via the exposure calculation unit 14 and the imaging control unit 4 sets a shutter speed corresponding to the exposure amount.

Advantages similar to those of the first embodiment are achieved through this embodiment. Furthermore, since the live view signals, as well as the AF signals and the AE signals, are read out in the same frame in the batch read mode, the length of time required for the signal read can be reduced compared to the first embodiment by adopting this embodiment.

It is to be noted that according to the present invention, a modification similar to that made on the first embodiment so as to achieve the third embodiment, may be adopted in conjunction with the second embodiment.

In the first through third embodiments described above, the image signals used for the live view display do not include signals output from the focus detection pixels and thus, a live view image with sharp color definition, comparable to those achieved in the related art, is obtained.

Fourth Embodiment

Figure 20:
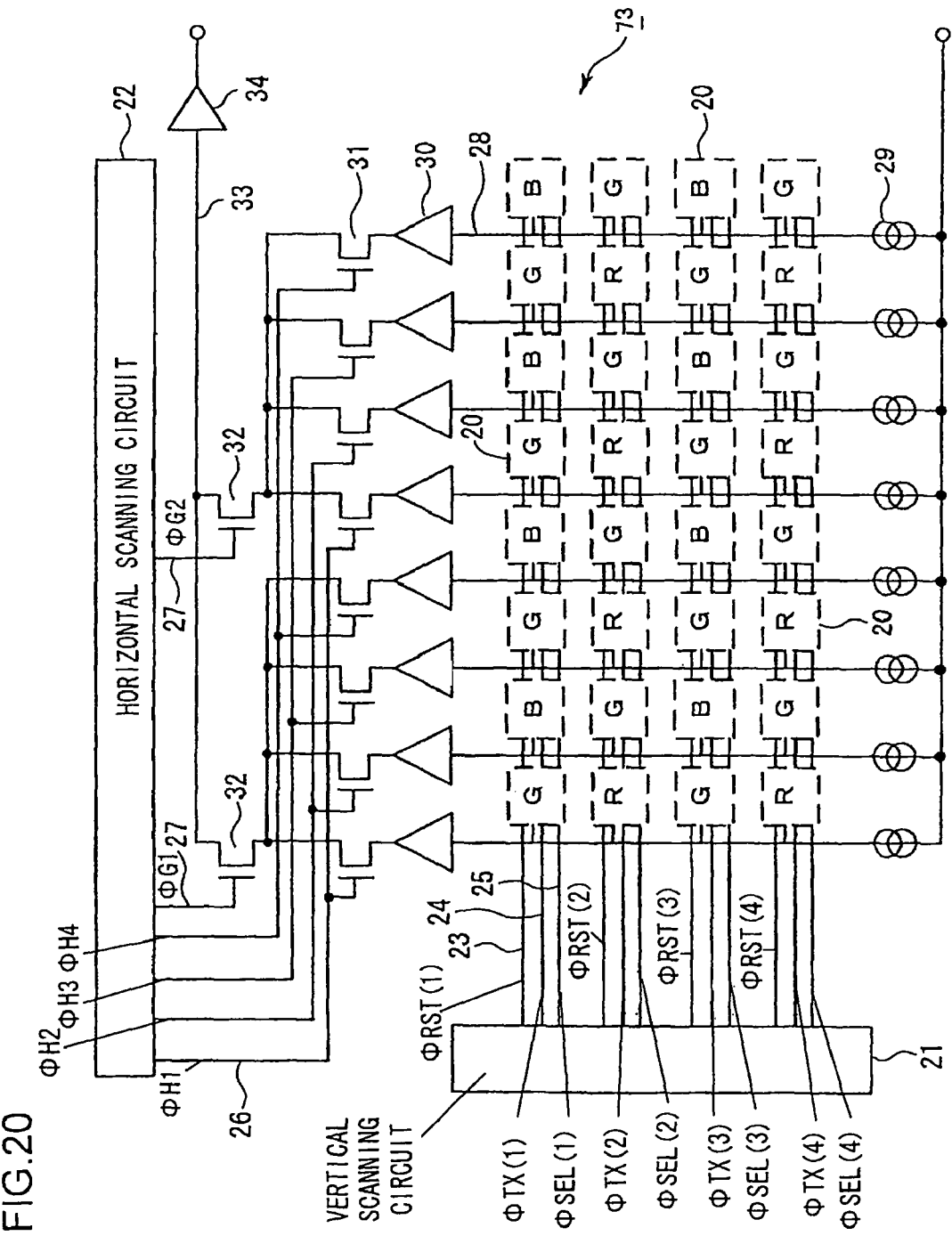
FIG. 20 is a circuit diagram schematically illustrating the structure of the solid-state image sensor achieved in a fourth embodiment of the present invention.

FIG. 20 is a circuit diagram similar to those in FIGS. 2 and 11, showing a solid-state image sensor 73 in the electronic camera achieved in the fourth embodiment of the present invention. FIG. 20 shows 32 pixels disposed along eight columns set side-by-side in the horizontal direction and along four rows set side-by-side in the vertical direction. However, the actual number of pixels in the image sensor achieved in the embodiment is far greater than 32, although there are no specific requirements imposed with regard to the number of pixels in the present invention.

The solid-state image sensor 73 in the embodiment includes imaging pixels 20e such as that shown in FIGS. 5A and 5B and AF pixels 20a and 20b such as those shown in FIGS. 6A, 6B, 7A and 7B respectively. The solid-state image sensor 73 further includes AF pixels 20c and 20d assuming structures different from those of the AF pixels 20a and 20b, as explained later. However, the pixels shown in FIG. 20 are all assigned with reference numeral 20, without distinguishing one type of pixel from another.

The peripheral circuits include a vertical scanning circuit 21, a horizontal scanning circuit 22, drive signal lines 23 through 27 connected to the scanning circuits, vertical signal lines 28 at which signals from the pixels 20 are received, constant current sources 29 and column amplifiers 30 connected to the vertical signal lines 28, front-stage switches 31 and rear-stage switches 32, each constituted with a transistor, a horizontal signal line 33 at which signals output from the column amplifiers 30 are received via the front-stage switches 31 and the rear-stage switches 32, an output amplifier 34 and the like.

The front-stage switches 31 in the embodiment are each installed in correspondence to a set of a vertical signal line 28 and a column amplifier 30. The rear-stage switches 32, on the other hand, are each installed in correspondence to a group made up with four vertical signal lines 28 set side-by-side along the direction in which the rows extend (i.e., in correspondence to four front-stage switches 31). One end of each front-stage switch 31 is connected to the corresponding column amplifier 30, and the other ends of the four front-stage switches 31 in the same group are commonly connected to one end of the rear-stage switch 32 corresponding to the particular group. The other ends of the individual rear-stage switches 32 are connected to the horizontal signal line 33. The gate of a front-stage switch 31 in a given group and the gate of the corresponding front-stage switch 31 in another group are commonly connected so as to receive a common drive signal φH from the horizontal scanning circuit 22. Drive signals φG from the horizontal scanning circuit 22 are received at the gates of the individual rear-stage switches 32. The structure adopted in this embodiment allows signals from four pixels 20 set next to each other in a row to be added up and their sum to be read out for horizontal pixel summing or the signals from the pixels arrayed in a row to be individually read out without executing horizontal pixel summing, simply by adjusting the drive signals φH and φG provided from the horizontal scanning circuit 22. The number of pixels, the signals from which are added together in the horizontal pixel summing, is not limited to four and it may be set to any desired number. It will be obvious that selective horizontal pixel summing may be enabled in a circuit structure other than that described above.

The pixels 20, which include the pixels 20a, 20b, 20c, 20d and 20e all assume identical circuit structures, such as that shown in FIG. 3.

The horizontal scanning circuit 22 outputs control signals φH1~φH4, φG1 and φG2 in response to drive pulses (not shown) received from the imaging control unit 4.

FIG. 21 is a schematic plan view showing the effective pixel area of the solid-state image sensor 73. For purposes of simplification, it is assumed that the effective pixel area contains 16×16 pixels 20, as shown in FIG. 21. Focus detection areas are enclosed within bold lines in FIG. 21. As FIG. 21 indicates, the effective pixel area at the solid-state image sensor 73 in the embodiment includes two focus detection areas set at the center of the effective pixel area and intersecting each other so as to form a cross shape, two focus detection areas ranging along the up/down direction and disposed on the left side and the right side and two focus detection areas ranging along the left/right direction and disposed at an upper position and a lower position. It is to be noted that an X axis, a Y axis and a Z axis extending perpendicular to one another are defined with regard to the effective pixel area at the solid-state image sensor 73, as shown in FIG. 21. A plane ranging parallel to the XY plane is aligned with the imaging surface (light-receiving surface) of the solid-state image sensor 73. The pixels 20 are set side-by-side in rows that extend along the X axis and in columns that extend along the Y axis.

Color filters disposed in a Bayer array are each mounted at one of the pixels 20 in the embodiment. The pixels at the solid-state image sensor 73 are categorized into one type of imaging pixel 20e and four types of AF pixels 20a, 20b, 20c and 20d without using the colors of the color filters at the pixels as a determining factor. The AF pixels 20a, 20b, 20c and 20d are respectively appended with letters a, b, c and d in FIG. 21.

FIG. 22A is a schematic plan view of the essential part of an AF pixel 20c, whereas FIG. 22B is a schematic sectional view taken along line Y1-Y2 in FIG. 22A. The AF pixel 20c differs from the imaging pixel 20e in that a rectangular opening 43d ranging over an area that matches the upper half (on the +Y side) of a square centering on the optical axis O of the microlens 42 (a square with the size equal to that of the opening 43a) is formed at the light shield layer 43 of the AF pixel 20C. Thus, a light flux departing an area of the exit pupil offset along the −Y direction relative to the center of the exit pupil of the photographic lens 2 is selectively received and undergoes photoelectric conversion at the photodiode PD of the AF pixel 20c.

Figure 23A:
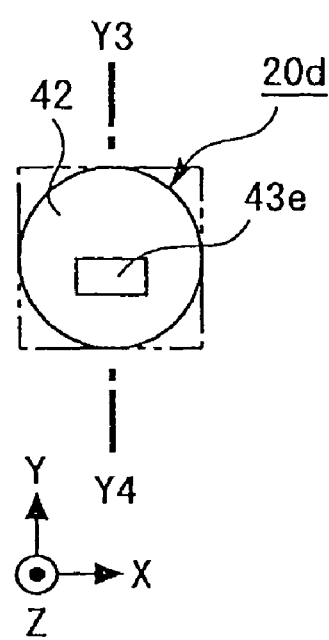
FIGS. 23A and 23B schematically illustrate the essential part of another AF pixel.
Figure 23B:
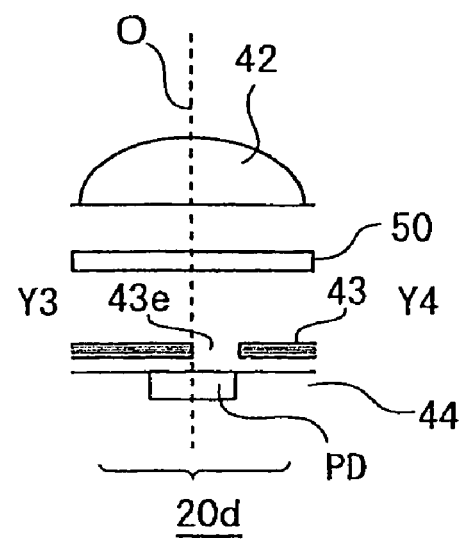

FIG. 23A is a schematic plan view of the essential part of an AF pixel 20d, whereas FIG. 23B is a schematic sectional view taken along line Y3-Y4 in FIG. 23A. The AF pixel 20d differs from the imaging pixel 20e in that a rectangular opening 43e ranging over an area that matches the lower half (on the −Y side) of a square centering on the optical axis O of the microlens 42 (a square with the size equal to that of the opening 43a) is formed at the light shield layer 43 of the AF pixel 20d. Thus, a light flux departing an area of the exit pupil offset along the +Y direction relative to the center of the exit pupil of the photographic lens 2 is selectively received and undergoes photoelectric conversion at the photodiode PD of the AF pixel 20d.

It is to be noted that the color filters 50 do not need to be disposed in a Bayer array. In addition, it is not strictly necessary to dispose color filters 50 at the AF pixels 20a, 20b, 20c and 20d even when the solid-state image sensor 73 is configured as a color image sensor.

Figure 24:
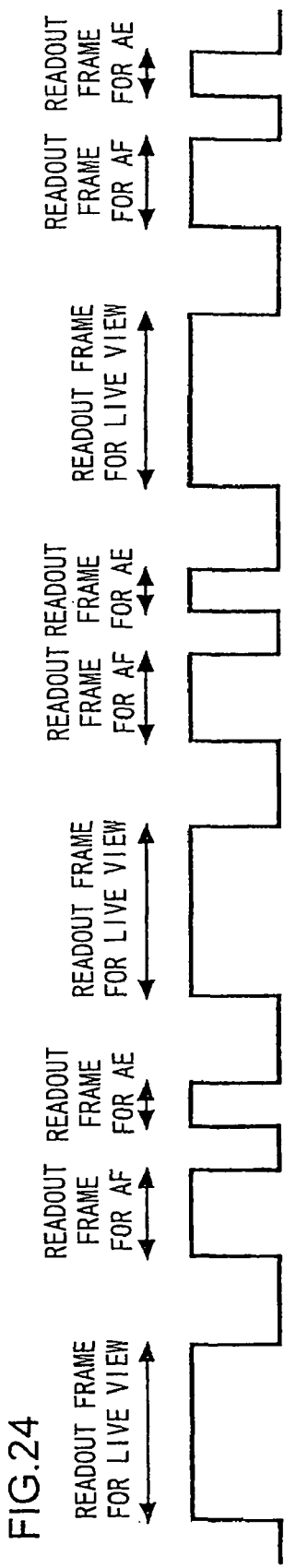
FIG. 24 is a timing chart schematically illustrating the signal read conditions under which signals are read from the solid-state image sensor while the electronic camera in the fourth embodiment of the present invention is set in a specific operation mode.

FIG. 24 presents a timing chart schematically illustrating the signal read conditions under which signals are read from the solid-state image sensor 73 in the electronic camera set in a specific operation mode in the embodiment. The electronic camera in the embodiment repeatedly performs a readout frame for live view, a readout frame for AF and a readout frame for AE in sequential cycles, as shown in FIG. 24. During the readout frame for live view, the solid-state image sensor 73 is engaged in operation in the live view read mode in which imaging signals to be used for live view display are read out from the solid-state image sensor 73. During the readout frame for AF, the solid-state image sensor 73 is engaged in operation in a focus detection read mode (may also be referred to as an "AF read mode") in which focus detection signals are read out from the solid-state image sensor 73. During the readout frame for AE, the solid-state image sensor 73 is engaged in operation in an automatic exposure read mode (may also be referred to as an "AE read mode") in which imaging signals to be used as photometry information for automatic exposure are readout from the solid-state image sensor 73. For instance, the readout frame for live view may be set over approximately $\frac{1}{40}$ sec, the readout frame for AF may be set over approximately $\frac{1}{100}$ sec and the readout frame for AE may be set over approximately $\frac{1}{200}$ sec. It is to be noted that these read modes may be selected in an order other than that in the example presented in FIG. 24. Specific examples of the individual read modes are described below.

Assuming that the pixels 20 are arranged in a specific array such as that shown in FIG. 21, signals from the pixels 20 are read out through a discriminative read along the columnar direction under control executed by the imaging control unit 4 in the live view read mode. For instance, signals may be read out from the pixels 20 in the rows indicated by the circles on the right side in FIG. 21 by skipping two rows in between. Namely, signals may be read out from the pixels in rows 1, 4, 7, 10, 13 and 16. It is desirable to ensure that an even number of rows are skipped in the discriminative read, in order to read out signals with the colors they represent sustaining a Bayer array sequence. While it is more desirable to read out the signals from the pixels 20 through a discriminative read executed along the columnar direction so as to complete the signal read quickly in the live view read mode, the signals from the pixels 20 in all the rows may be read out instead.

Figure 25:
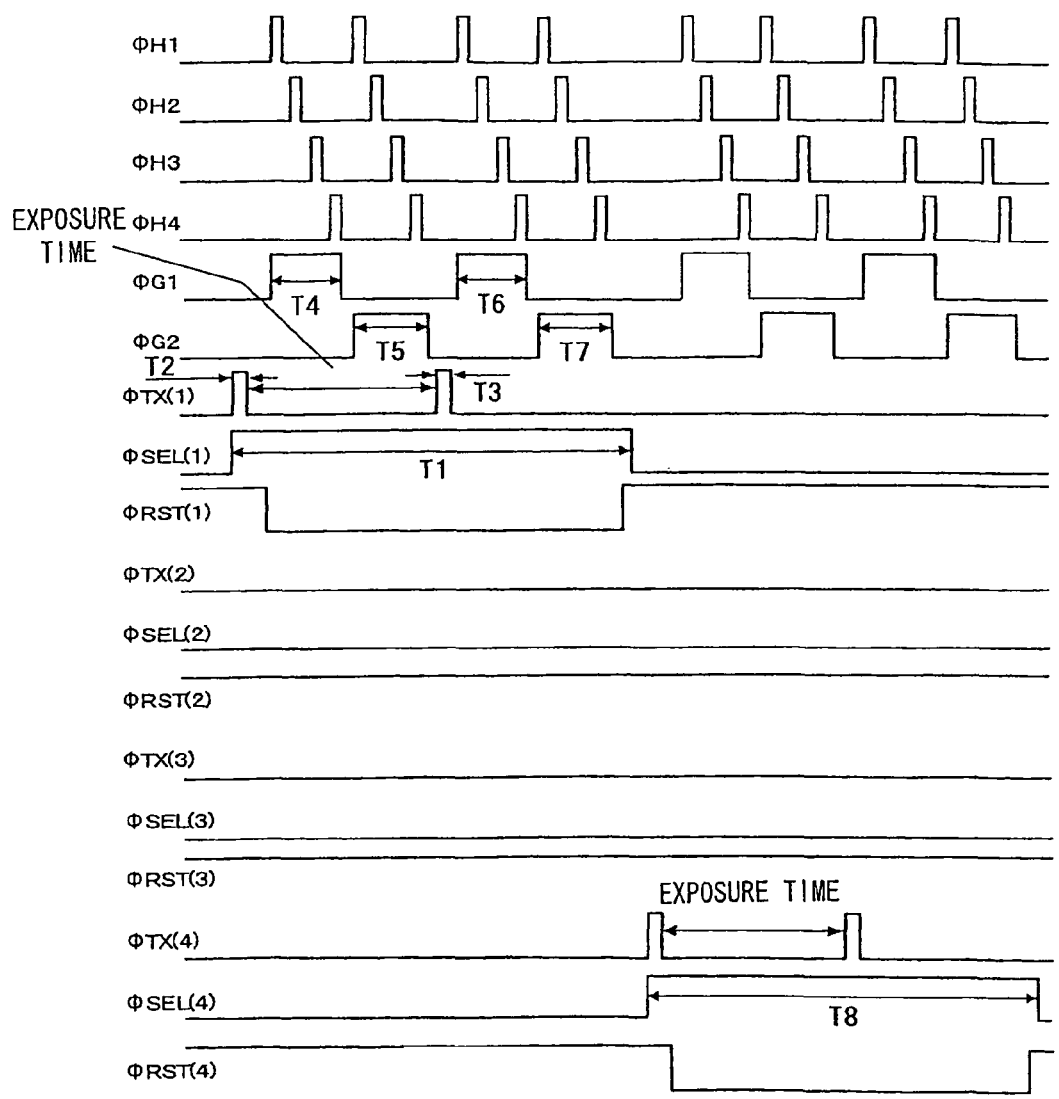
FIG. 25 is a timing chart representing an example of operations that may be executed while the electronic camera in the fourth embodiment of the present invention is set in the live view read mode.

FIG. 25 presents a timing chart of control signals that may be output in order to read out the signals from the pixels in row 1, skip the signal read from the pixels in rows 2 and 3 and read out the signals from the pixels in row 4 in the live view read mode, in the configuration shown in FIG. 20 with 4×8 pixels 20. In this example, the signals are read out from all the pixels present in the read target rows without executing horizontal pixel summing. Moreover, an electronic shutter operation is executed through the rolling shutter method. During a period T1 in FIG. 25, the pixels in row 1 are selected. The pixels in row 1 are exposed during the period of time elapsing between the end point of a period T2 and the start point of a period T3. CDS processing through which the differences between signals read out during periods T4 and T5 and signals read out during periods T6 and T7 are determined, is executed by the signal processing unit 5 installed outside the solid-state image sensor 3. During a period TB, in which the pixels in row 4 are selected, an operation similar to that executed during the period T1 is executed for the pixels in row 4.

In the example presented in FIG. 25, the signals are read out from all the pixels in each read target row in the live view read mode, as described above. However, the signals at pixels belonging to specific columns alone, among the pixels arrayed in the row, may instead be read out in the live view read mode. For instance, the signals may be read out from predetermined pixels in specific columns over intervals each matching four skipped columns, among the pixels arrayed in the row. In this case, the signal read can be executed even more quickly. Such a signal read, through which the signals are read out from pixels belonging to specific columns alone may be achieved via a horizontal scanning circuit 22 constituted with a shift register circuit such as that disclosed in Japanese Laid Open Patent Publication No. 2007-208685. It is to be noted that the signals at pixels in specific rows alone may be read out in a discriminative read in the live view read mode via a vertical scanning circuit 21 constituted with a shift register circuit such as that disclosed in Japanese Laid Open Patent Publication No. 2007-208685.

Assuming that the pixels 20 are arrayed as shown in FIG. 21, signals are read out from the pixels in rows 3, 8 and 14 corresponding to the three focus detection areas extending along the row direction, as indicated by the circles on the right side in FIG. 21. In the embodiment, the signals at all the pixels set side-by-side along the horizontal direction in these rows are read out. However, signals may instead be read out from the pixels belonging to the columns corresponding to the focus detection areas alone, among the pixels disposed side-by-side along the horizontal direction. In this example, it is assumed, based upon the previous live view image or the like that the focusing condition for the subject can be detected more accurately with the signals from the focus detection areas extending along the direction in which the rows extend, rather than the signals from the focus detection areas extending along the columnar direction. Based upon this judgment, the signals are read out from the pixels in the rows corresponding to the three focus detection areas extending along the row direction under control by the imaging control unit 4. However, if it is judged based upon the preceding live view image or the like that the focusing condition for the subject can be detected more accurately with the signals from the focus detection areas extending along the columnar direction rather than with the signals from the focus detection areas extending along the row direction, the signals will be selectively read out from the pixels in rows 6~11 under control executed by the imaging control unit 4. During this process, the signals will be read out from all the pixels 20 set side-by-side along the horizontal direction in these rows. However, signals may instead be read out from the pixels present over the areas corresponding to the focus detection areas extending along the columnar direction, among the pixels set side-by-side along the horizontal direction. It is to be noted that depending upon the subject conditions and the like, signals may be read out from a single focus detection area. In addition, the focusing condition may be detected with an even higher level of accuracy in the AF read mode by reading out the signals from all the focus detection areas, i.e., the focus detection areas extending along both the row direction and the columnar direction. This point will be further explained later in reference to a specific example in the sixth embodiment.

Figure 26:
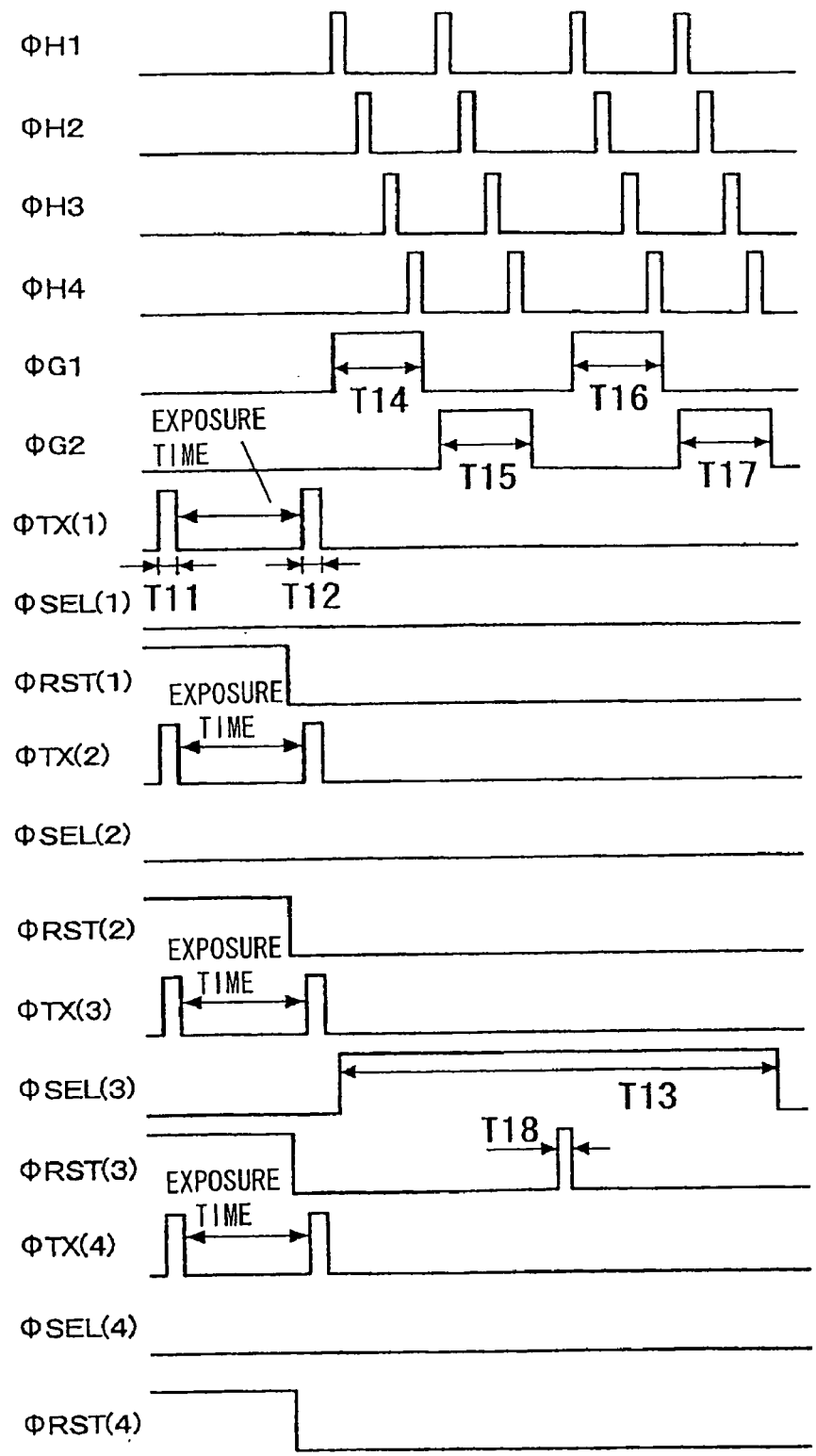
FIG. 26 is a timing chart representing an example of operations that may be executed while the electronic camera in the fourth embodiment of the present invention is set in the AF read mode.

FIG. 26 presents a timing chart of control signals that may be output in order to skip the read of the signals from the pixels in rows 1 and 2, read out the signals from the pixels in row 3 and skip the read of the signals from the pixels in row 4 in the AF read mode in the configuration shown in FIG. 20 with the 4×8 pixels 20. In this example, the signals are read out from all the pixels in each read target row without executing horizontal pixel summing. In addition, an electronic shutter operation is executed so that all the pixels 20 are exposed over a uniform length of time with matching timing. As a result, the accuracy of the focus detection can be greatly improved, since the signals read out from the individual AF pixels in correspondence to a given frame, unlike those read out through a rolling shutter method, manifest no time lag. It is to be noted that only specific pixels 20 from which valid signals must to be read out for purposes of focus detection alone may be exposed over a uniform length of time with matching timing, instead.

In the example presented in FIG. 26, the signals are read out from all the pixels in each read target row in the AF read mode, as described above. However, the signals at pixels belonging to specific columns alone, among the pixels arrayed in the row, may instead be read out in the AF read mode. For instance, the signals may be read out from pixels belonging to the columns corresponding to the focus detection areas, among the pixels arrayed in the row. In this case, the signal read can be executed even more quickly. Such a signal read, through which the signals are discriminatively read out from pixels belonging to specific columns alone may be achieved via a horizontal scanning circuit 22 constituted with a shift register circuit such as that disclosed in Japanese Laid Open Patent Publication No. 2007-208685. It is to be noted that the signals at pixels in specific rows alone may be read out in a discriminative read in the AF read mode via a vertical scanning circuit 21 constituted with a shift register circuit such as that disclosed in Japanese Laid Open Patent Publication No. 2007-208685.

FIG. 26 indicates that all the pixels 20 undergo exposure over the period elapsing between the end point of a period T11 and the start point of a period T12. During a period T13, the pixels in row 3 are selected. CDS processing through which the differences between signals read out during periods T14 and T15 and signals read out during periods T16 and T17 are determined, is executed by the signal processing unit 5 installed outside the solid-state image sensor 73. During this process, the signal component is obtained during the periods T14 and T15, whereas the noise component is obtained during the periods T16 and T17. A reset period T18 elapses between these signal acquisition periods and thus, any noise occurring during the reset period T18 is bound to remain in the signals. However, such noise remaining in the signals does not affect the focus detection accuracy significantly.

Assuming that the pixels 20 are arrayed as shown in FIG. 21, signals may be read out from the pixels in two successive rows, 1 and 2. Then, the signal read may be skipped over an even number of rows, e.g., six rows, and signals may be read out from the pixels in rows 9 and 10 in the AE read mode, as indicated by the circles on the right side in FIG. 21. Since the color filters 50 are disposed in the Bayer array, signals are read out from the different-color adjacent pixels in the two rows set side-by-side along the columnar direction as signals are read from the pixels in pairs of rows each made up with two successive rows following an even number of rows skipped along the columnar direction. Thus, the extent of false color is reduced compared to cases in which signals are read out from rows that are not successive. As a result, an advantage is achieved in that automatic exposure control is executed with a higher level of accuracy.

In addition, the signals (AE signals) used as the photometry information for automatic exposure may simply need to assure the level of resolution provided in local average information and they may need to assure a high level of sensitivity rather than a higher level of resolution. Accordingly, signals from four pixels 20 set side-by-side in a row are added together and the sum is read out through horizontal pixel summing in the AE read mode in the embodiment. In the horizontal pixel summing, signals from pixels corresponding to different colors are added together. In other words, signals indicating different colors are added together in the embodiment. However, a structure that allows the signals from pixels arrayed along the horizontal direction to be added in correspondence to each color may be adopted instead. In such a case, with a Bayer array unit expressed as "R, G1, G2 and B", two horizontal signal lines 33 may be installed in correspondence to the individual colors (one signal line for G1 and G2 and another signal line for R and B) or four horizontal signal lines 33 may be installed in correspondence to the individual colors (one signal line in correspondence to each of R, G1, G2 and B). It is to be noted that the signals from all the pixels 20 present in the read target rows may be individually read out without executing horizontal pixel summing in the AE read mode according to the present invention.

In the example presented in FIG. 26, the signals are read out through the horizontal pixel summing from all the pixels in each read target row in the AE read mode, as described above. However, the signals from pixels belonging to specific columns alone, among the pixels arrayed in the row, may instead be read out in the AE read mode, without executing the horizontal pixel summing. In this case, too, the signal read can be executed quickly. Such a discriminative signal read, through which the signals are readout from pixels belonging to specific columns alone may be achieved via a horizontal scanning circuit 22 constituted with a shift register circuit such as that disclosed in Japanese Laid Open Patent Publication No. 2007-208685. It is to be noted that the signals at pixels in specific rows alone may be read out in the AE read mode via a vertical scanning circuit 21 constituted with a shift register circuit such as that disclosed in Japanese Laid Open Patent Publication No. 2007-208685.

Figure 27:
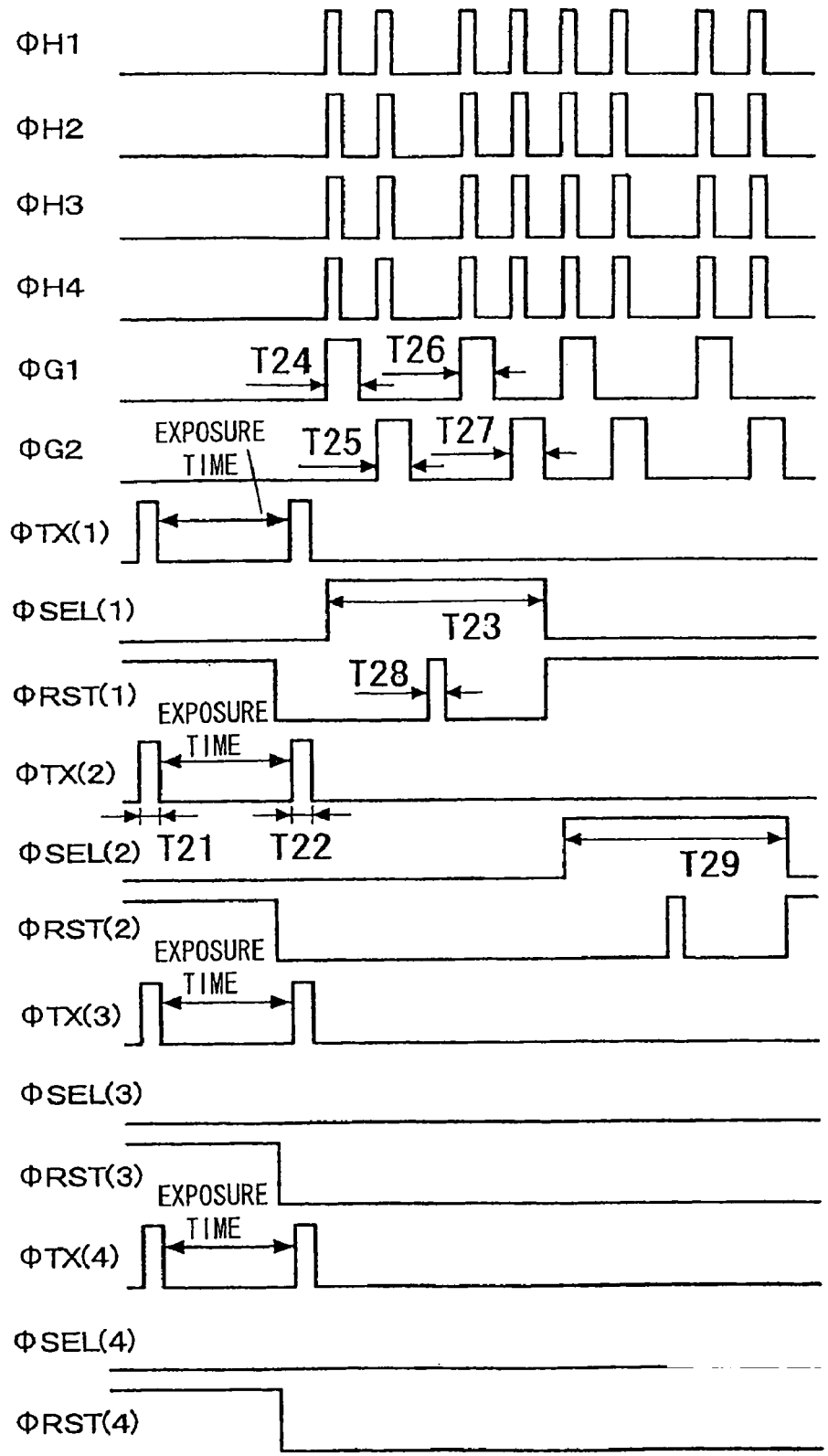
FIG. 27 is a timing chart representing an example of operations that may be executed while the electronic camera in the fourth embodiment of the present invention is set in the AE read mode.

FIG. 27 presents a timing chart of control signals that may be output in order to read out the signals from the pixels in rows 1 and 2 and skip the read of the signals from the pixels in rows 3 and 4 in the AE read mode in the configuration shown in FIG. 20 with the 4×8 pixels 20. In this example, sums each obtained by summing four signals from pixels 20 set side-by-side along the horizontal direction are read out. In addition, an electronic shutter operation is executed so that all the pixels 20 are exposed over a uniform length of time with matching timing. As a result, the accuracy of the automatic exposure control can be greatly improved since the imaging signals read out in correspondence to a given frame to be used as sets of photometry information for automatic exposure, unlike those read through a rolling shutter method, manifests no time lag. It is to be noted that only specific pixels 20 from which valid signals need to be read out for purposes of exposure amount detection alone may be exposed over a uniform length of time with matching timing, instead.

FIG. 27 indicates that all the pixels 20 undergo exposure over the period elapsing between the end point of a period T21 and the start point of a period T22. During a period T23, the pixels in row 1 are selected. CDS processing through which the differences between signals each representing the sum of the signals from the four pixels set side-by-side along the horizontal direction, read out during periods T24 and T25 and signals each representing the sum of the signals from the four pixels set side-by-side along the horizontal direction, read out during the periods T26 and T27, are determined, is executed at the signal processing unit 5 installed outside the solid-state image sensor 73. During this process, the signal component is obtained during the periods T24 and T25, whereas the noise component is obtained during the periods T26 and T27. A reset period T28 elapses between these signal acquisition periods and thus, any noise occurring during the reset period T28 is bound to remain in the signals. However, such noise remaining in the signals does not affect the exposure amount detection accuracy significantly.

In the electronic camera achieved in the embodiment set in the operation mode in which the readout frame for live view, the readout frame for AF and the readout frame for AE are cyclically repeated, as explained above in reference to FIG. 24, the imaging signals read out for each readout frame for live view are output to the display control unit 15 via the signal processing unit 5, the A/D conversion unit 6 and the memory 7. Based upon the imaging signals, a live view image is brought up on display at the liquid crystal display unit 16 under control executed by the display control unit 15. In addition, in the operation mode shown in FIG. 24, the AF signals read out for each readout frame for AF are output to the focus calculation unit 10 via the signal processing unit 5, the A/D conversion unit 6 and the memory 7. Based upon the AF signals, the focus calculation unit 10 calculates the defocus amount through the split-pupil phase difference method and autofocus is executed via the lens control unit 2a driving the photographic lens 2 in correspondence to the defocus amount so as to achieve the focus match state. In the operation mode shown in FIG. 24, the AE signals read out for each readout frame for AE are output to the exposure calculation unit 14 via the signal processing unit 5, the A/D conversion unit 6 and the memory 7. Based upon the AE signals, the exposure calculation unit 14 calculates the optimal exposure amount, the lens control unit 2a adjusts the aperture of the photographic lens 2 so as to achieve an exposure amount correspond to the exposure amount determined via the exposure calculation unit 14 and the imaging control unit 4 sets a shutter speed corresponding to the exposure amount.

As described above, while the live view image is displayed at the liquid crystal display unit 16 based upon signals read out in the live view read mode, autofocus is executed for the photographic lens through the split-pupil phase difference method based upon signals read out in the AF read mode and automatic exposure control is executed based upon signals read out in the AE read mode at the electronic camera achieved in the embodiment. The user is thus able to view an in-focus live view display image with optimal exposure. In addition, since AF control is executed in the embodiment through the split-pupil phase difference method while the live view image is on display, even a subject present within a relatively short range and moving at a relatively high speed can be displayed in the live view display in the focus match state on the subject. This feature is bound to increase the user convenience significantly.

The operation mode in FIG. 24 may be started up in response to, for instance, a halfway press operation of a shutter release button at the operation unit 9a performed by the user after setting the electronic camera in the photographing mode. Then, as the shutter release button is pressed all the way down, the main photographing operation may be executed. Since the focus match state and the optimal exposure state are achieved prior to the full press operation, the shutter can be pressed immediately without missing any good photo opportunity.

While the main photographing operation is executed via an electronic shutter alone in the embodiments described so far, it will be obvious that the present invention may also be adopted in conjunction with a mechanical shutter.

Fifth Embodiment

Figure 28:
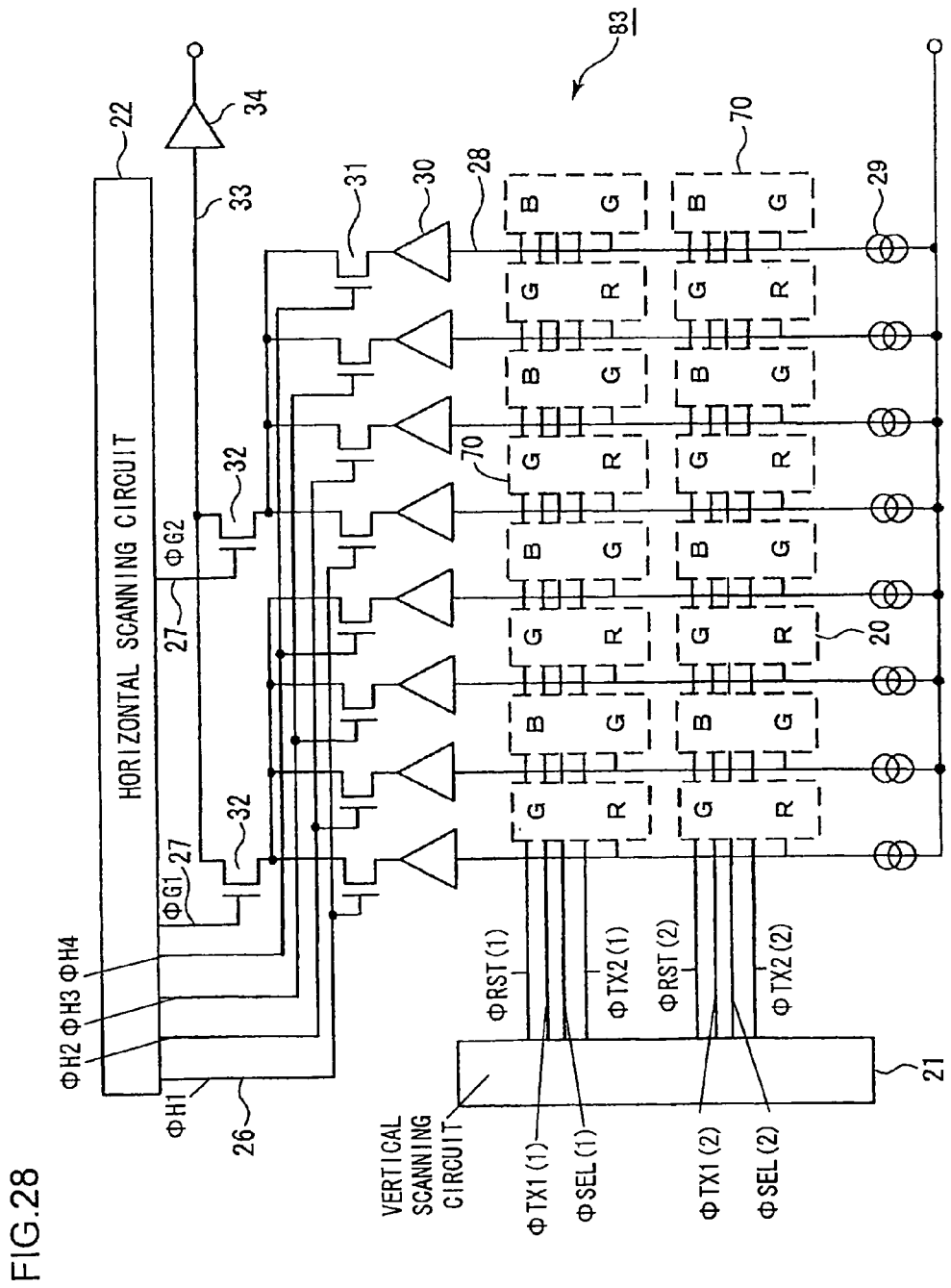
FIG. 28 is a circuit diagram of the solid-state image sensor in the electronic camera achieved in a fifth embodiment of the present invention.

FIG. 28 is a circuit diagram similar to those in FIGS. 2, 11 and 20, showing a solid-state image sensor 83 in the electronic camera achieved in the fifth embodiment of the present invention. As does FIG. 20, FIG. 28 shows 4×8 pixels 20 (2×8 pixel blocks 70). The circuit diagram of the pixel blocks 70 at the solid-state image sensor 83 in FIG. 28 is identical to that presented in FIG. 13. In FIG. 28, the same reference numerals are assigned to elements identical to or corresponding to those in FIG. 20, so as to preclude the necessity for a reputed explanation thereof.

The following features differentiate the current embodiment from the fourth embodiment in much the same way that certain features of the second embodiment described earlier differentiate it from the first embodiment. Namely, each two pixels set adjacent to each other along the columnar direction at the solid-state image sensor 83, share a single set of a floating diffusion FD, an amplifier transistor AMP, a reset transistor RES and a selector transistor SEL. FIG. 28 shows pixel blocks 70 each constituted with two pixels 20 sharing the set of the floating diffusion FD, the amplifier transistor AMP, the reset transistor RES and the selector transistor SEL.

The schematic plan view of the effective pixel area at the solid-state image sensor 83 in the embodiment will be similar to that in FIG. 21. The specific pixel rows from which the signals are read out in the various read modes at the solid-state image sensor are indicated by the circles. However, signals are read out from the pixels in rows 2 and 3 in the AE read mode. In addition, in this embodiment, similarly to the first embodiment, the readout frame for live view, the readout frame for AF and the readout frame for AE are cyclically repeated.

Figure 29:
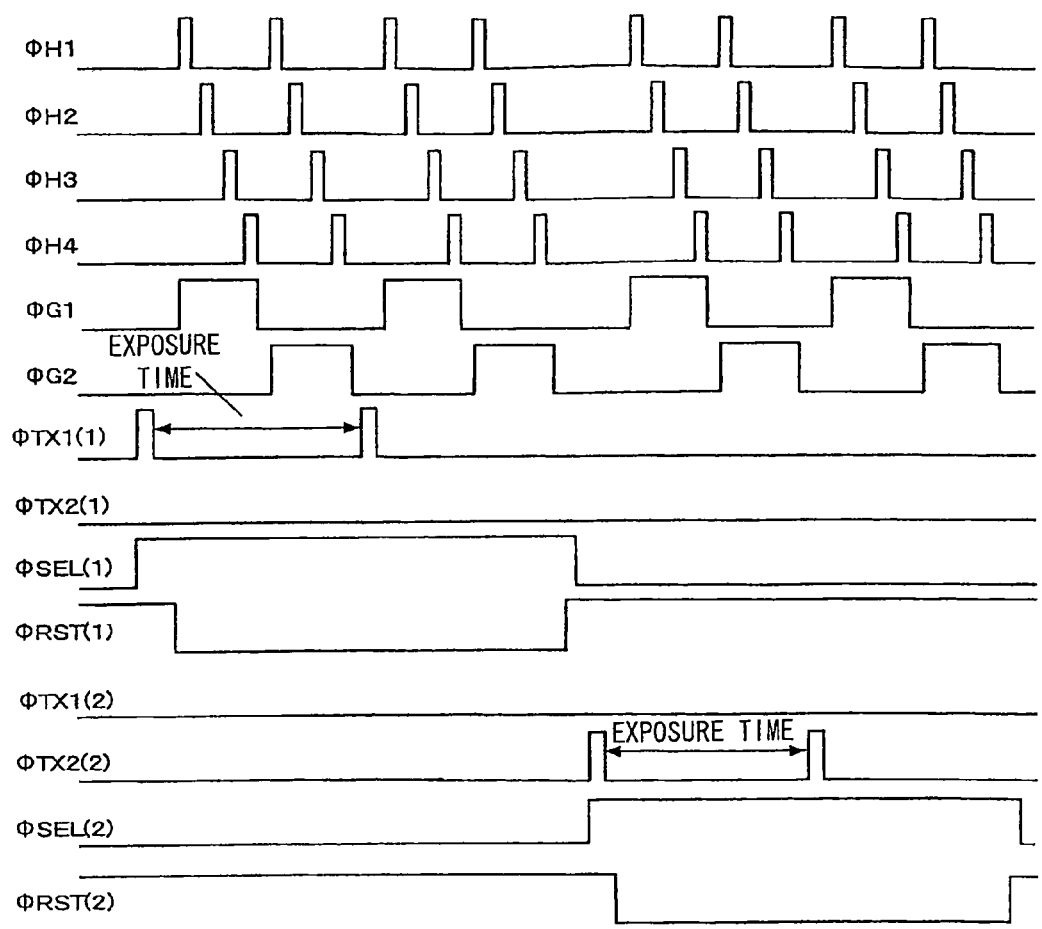
FIG. 29 is a timing chart representing an example of operations that may be executed while the electronic camera in the fifth embodiment of the present invention is set in the live view read mode.

FIG. 29 presents a timing chart similar to that in FIG. 25, showing control signals that may be output in order to read out the signals from the pixels in row 1 (from the upper pixels in the pixel blocks 70 in row 1), skip the signal read from the pixels in rows 2 and 3 (skip the signal read from the lower pixels in the pixel blocks 70 in row 1 and the upper pixels in the pixel blocks 70 in row 2) and read out the signals from the pixels in row 4 (the lower pixels in the pixel blocks 70 in row 2) in the live view read mode, in the configuration shown in FIG. 28 with 4×8 pixels 20 (2×8 pixel blocks 70). In this example, too, the signals are read out from all the pixels present in each read target row without executing horizontal pixel summing and an electronic shutter operation is executed through the rolling shutter method.

Figure 30:
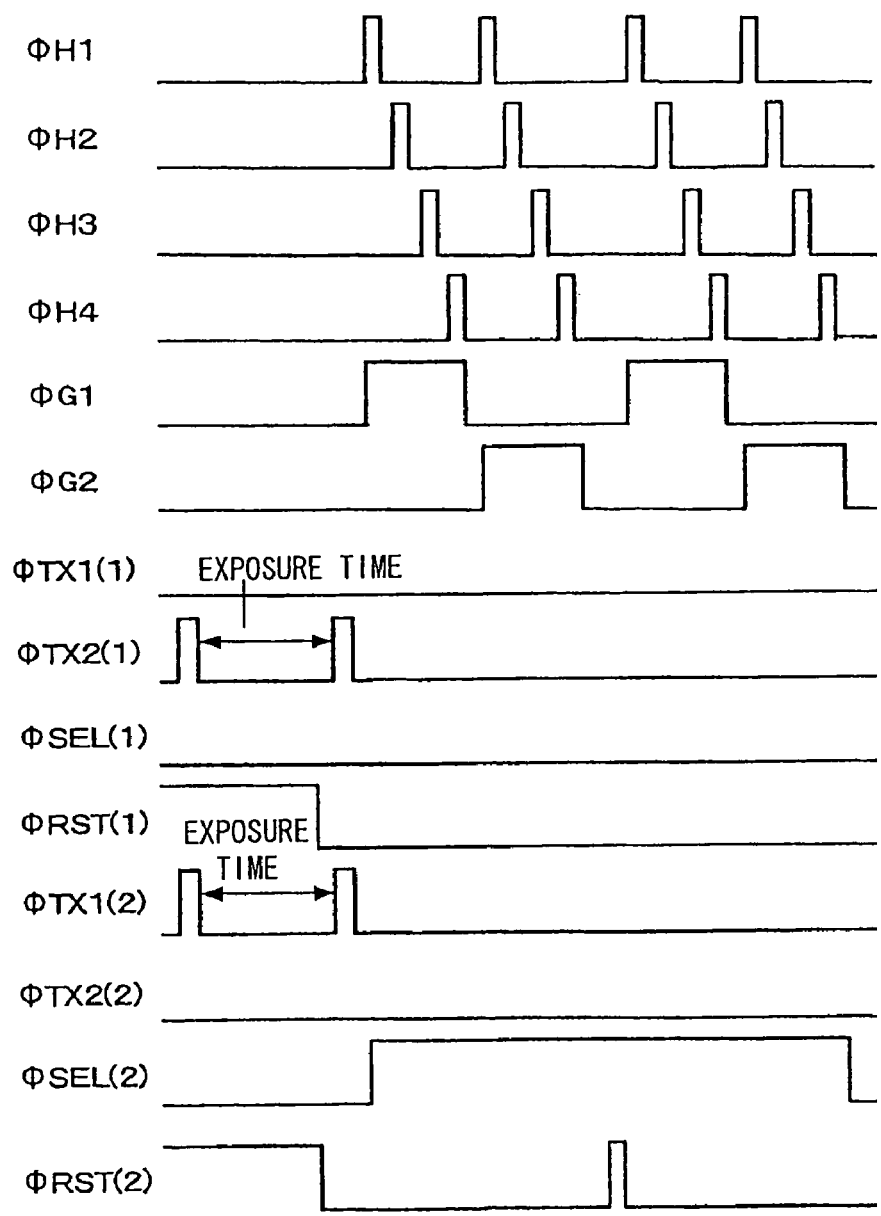
FIG. 30 is a timing chart representing an example of operations that may be executed while the electronic camera in the fifth embodiment of the present invention is set in the AF read mode.

FIG. 30 presents a timing chart similar to that in FIG. 26, showing control signals that may be output in order to skip the signal read from the pixels in rows 1 and 2 (from the upper pixels and the lower pixels in the pixel blocks 70 in row 1), read out the signals from the pixels in row 3 (from the upper pixels in the signal blocks 70 in row 2) and skip the signal read from the pixels in row 4 (from the lower pixels in the pixel blocks 70 in row 2) in the AF read mode in the configuration shown in FIG. 28 with 4×8 pixels 20 (2×8 pixel blocks 70). In this example, too, the signals are read out from all the pixels present in each read target row without executing horizontal pixel summing and an electronic shutter operation is executed for all the pixels 20 so as to expose the individual pixels over a uniform length of time with matching timing.

Figure 31:
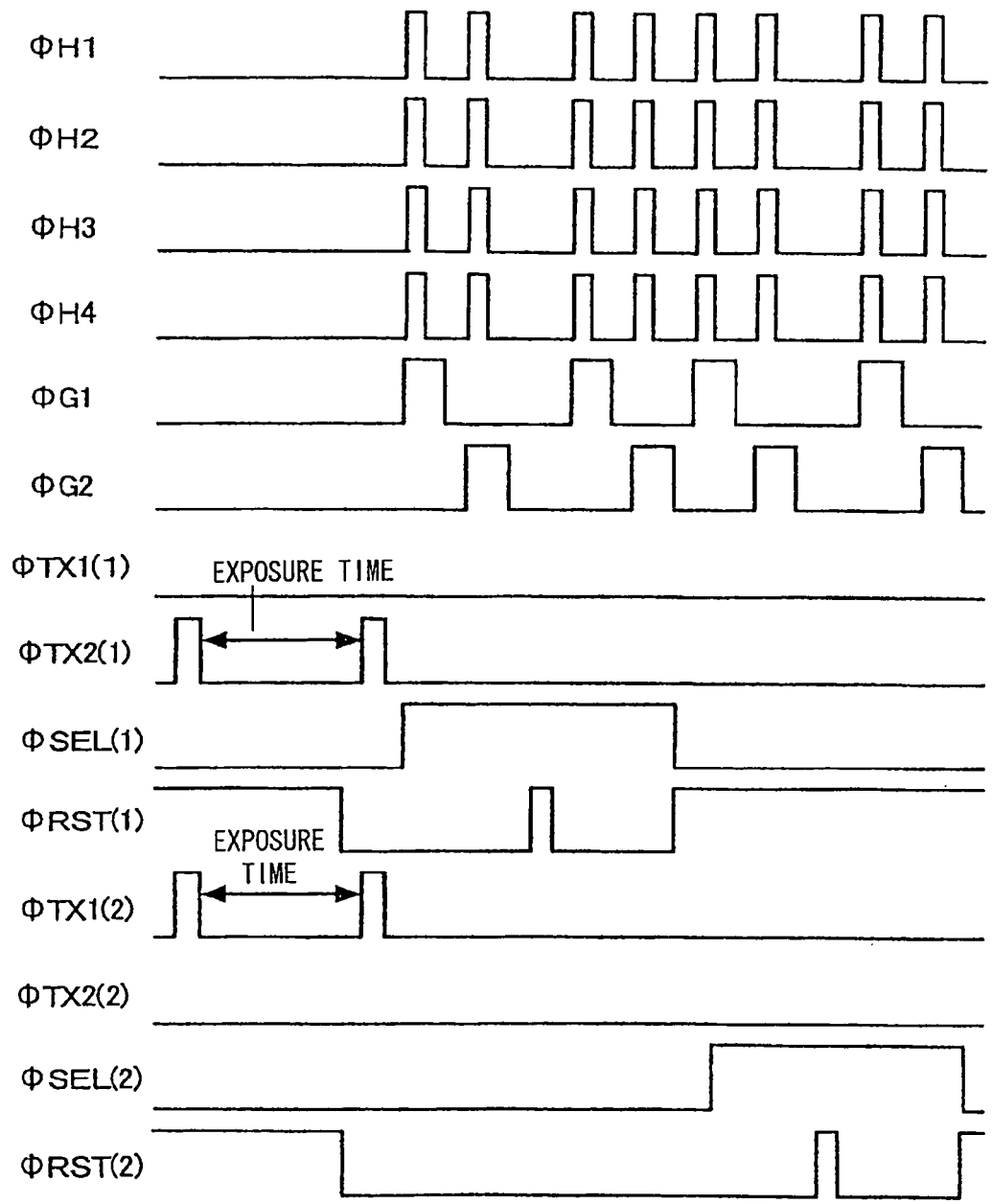
FIG. 31 is a timing chart representing an example of operations that may be executed while the electronic camera in the fifth embodiment of the present invention is set in the AE read mode.

FIG. 31 presents a timing chart, distinct from that presented in FIG. 27, of control signals that may be output in order to skip the read of the signals from the pixels in row 1 (skip the read of signals from the upper pixels in the pixel blocks 70 in row 1), read out the signals from the pixels in rows 2 and 3 (from the lower pixels in the pixel blocks 70 in row 1 and the upper pixels in the pixel blocks 70 in row 2) and skip the read of the signals from the pixels in row 4 (the lower pixels in the pixel blocks 70 in row 2) in the AE read mode in the configuration shown in FIG. 28 with the 4×8 pixels 20 (2×8 pixel blocks 70). In this example, too, signals, each obtained as the sum of the signals from four pixels 20 set side-by-side along the horizontal direction are read out, and an electronic shutter operation is executed so that the read target pixels 20, are all exposed over a uniform length of time with matching timing.

Advantages similar to those of the fourth embodiment described earlier are achieved through the current embodiment. In addition, since a set of a floating diffusion FD, an amplifier transistor AMP, a reset transistor RES and a selector transistor SEL is shared by two pixels 20, the number of transistors to be provided in correspondence to each pixel is reduced and thus, the aperture ratio can be increased by adopting the embodiment.

It is to be noted that in the structure that includes pixel blocks 70 each made up with L (L is an integer equal to or greater than 2, L=2 in the embodiment) pixels 20 the photoelectric conversion units (photodiodes) of which are set side-by-side in sequence along the columnar direction with each pixel blocks 70 equipped with a common set of a floating diffusion FD, an amplifier transistor AMP, a reset transistor RES and a selector transistor SEL shared by the L pixels 20 belonging to the pixel block 70, as in the embodiment, the following conditions should be satisfied, as has been described in reference to the second embodiment. Namely, (i) signals from pixels present in two successive rows should be read out after each interval corresponding to M rows (M is an even number) skipped along the columnar direction in the AE read mode and (ii) M={L×(2+N)−2} (N is an integer equal to or greater than 0). Under condition (i) described above, the signals read out from the pixels present in the two rows adjacent to each other along the columnar direction represent different colors and thus, the extent of false color is reduced compared to a condition under which signals are read out from discrete rows. As a result, the automatic exposure control can be executed more accurately. In addition, under condition (ii) described above, rows of pixels from which the signals are to be read out are exposed over a uniform length of time with matching timing while the pixels in each pixel blocks 70 share a single set of a floating diffusion FD, an amplifier transistor AMP and the like. In such an electronic shutter operation, imaging signals to be used as individual sets of photometry information for automatic exposure are read out with no time lag. As a result, the accuracy of the automatic exposure control can be greatly improved.

Figure 32:
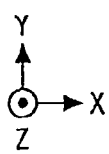
FIG. 32 is a schematic plan view showing the effective pixel area of the solid-state image sensor in the electronic camera achieved in a sixth embodiment of the present invention.

While an explanation is given above in reference to the fourth and fifth embodiments on an example in which three different read modes, i.e., the live view read mode, the AF read mode and the AE read mode are cyclically repeated in sequence, two read modes, e.g., the live view read mode and the AF read mode, may be cyclically and sequentially repeated instead. In such a case, a detector via which the photometry information for automatic exposure can be obtained, may be installed independently of the solid-state image sensor and the automatic exposure control may be executed based upon signals provided from the detector.

Sixth Embodiment FIG. 32, similar to FIG. 21, is a schematic plan view of the effective pixel area at the solid-state image sensor in the electronic camera achieved in the sixth embodiment of the present invention.

The sixth embodiment differs from the fourth embodiment in that signals are read out from different pixel rows in the AF read mode. In the fourth embodiment, signals are read out from the pixels in rows 3, 8 and 14, corresponding to the three focus detection areas extending along the row direction, as indicated by the circles on the right side in FIG. 21, in the AF read mode. On the other hand, in this embodiment, signals are read out from the pixels in rows 3, 6~11 and 14 in correspondence to all the focus detection areas including the three focus detection areas extending along the row direction and the three focus detection areas extending along the columnar direction in the AF read mode, as indicated by the circles on the right side in FIG. 32. The timing chart of such a signals read will be obtained by modifying the timing chart of the AF read mode in the fourth embodiment in correspondence to the specific read target rows. However, the signal read is skipped over the same rows and signals are read out from pixels in the same rows in the embodiment as those in the fourth embodiment, up to row 4. This means that the timing chart of the AF read mode in the embodiment up to row 4 is identical to that presented in FIG. 26.

In the embodiment, signals are read out from the pixels corresponding to all the focus detection areas, both the focus detection areas extending along the row direction and the focus detection areas extending along the columnar direction, in the AF read mode. As a result, the focusing condition can be detected with an even higher level of accuracy by adopting the embodiment.

While an explanation has been given in reference to specific embodiments of the present invention, the present invention is not in any way whatsoever limited to these examples.

For instance, while three read modes, i.e. the live view read mode, the AF read mode and the AE read mode, are cyclically repeated in sequence in the fourth through sixth embodiments described above, two read modes, e.g., the live view read mode and the AF read mode, may be cyclically repeated instead. In such a case, a detector via which the photometry information for automatic exposure can be obtained, may be installed independently of the solid-state image sensor and the automatic exposure control may be executed based upon signals provided from the detector.

In any of the first through fifth embodiments described above, AE signals are read out from pixels in rows different from those selected for the AF signal read. Thus, AE information assuring high sensitivity and high accuracy can be obtained.

What is claimed is:

1. A solid-state imaging device, comprising:
    a plurality of pixels disposed in a two-dimensional pattern and each equipped with a photoelectric conversion unit that generates and accumulates a signal charge corresponding to a subject image formed with light entering from an optical system;
    a readout control unit that executes control under which signals are read out from the plurality of pixels; and
    vertical signal lines each disposed in correspondence to at least one column of columns along which the plurality of pixels are arrayed, to which output signals from the pixels in the corresponding columns are provided, wherein:
    the plurality of pixels include a plurality of imaging pixels that output imaging signals for forming image signals that represent the subject image and a plurality of focus detection pixels that output focus detection signals for detecting a focusing condition of the optical system through a split-pupil phase difference method;
    the readout control unit sequentially and cyclically executes operation in two or more read modes while a specific operation mode is set;
    the two or more read modes include a live view read mode in which imaging signals for live view display are read out, and a focus detection and automatic exposure read mode in which the focus detection signals and imaging signals to be used as photometry information for automatic exposure are read out;
    in the focus detection and automatic exposure read mode, signals are read out in a single frame from pixel rows including the focus detection pixels and pixel rows excluding the focus detection pixels; and
    at least either the signals from the pixel rows including the focus detection pixels or the signals from the pixel rows excluding the focus detection pixels are read out through a discriminative read executed along a columnar direction in which the columns extend.

2. A solid-state imaging device according to claim 1, wherein:
    in the live view read mode, signals are read out in a single frame from pixel rows excluding the focus detection pixels through a discriminative read executed along a columnar direction in which the columns extend.

3. A solid-state imaging device according to claim 1, wherein:
    an electronic shutter operation is executed in the focus detection and automatic exposure read mode for pixels from which valid signals are to be read out so that the pixels are exposed over equal lengths of time with matching timing.

4. A solid-state imaging device according to claim 1, wherein:
    in the single frame of the focus detection and automatic exposure read mode, signals from the imaging pixels in two successive pixel rows excluding the focus detection pixels that follow each M-row (M is an even number) interval are read out to be used as the photometry information for automatic exposure, and signals from the focus detection pixels are read out to be used as the focus detection signals.

5. A solid-state imaging device according to claim 4, wherein:
    the plurality of pixels each further include a charge/voltage conversion unit that takes in the signal charge from the photoelectric conversion unit of the pixel and converts the signal charge to a voltage, an amplifier unit that outputs a signal corresponding to a potential at the charge/voltage conversion unit, a charge transfer unit that transfers the charge from the photoelectric conversion unit to the charge/voltage conversion unit, a reset unit that resets the potential at the charge/voltage conversion unit and a selector unit that selects the pixel;
    the plurality of pixels form pixel blocks each made up with L (L is an even number equal to or greater than 2) pixels with the photoelectric conversion units thereof set side-by-side in sequence along the columnar direction;

the L pixels in each pixel block share a common set of the charge/voltage conversion unit, the amplifier unit, the reset unit and the selector unit; and M satisfies a condition expressed as; $M=\{L\times(2+N)-2\}$ (N is an integer equal to or greater than 0).

6. A solid-state imaging device according to claim 1, wherein:

the plurality of pixels each further include a charge/voltage conversion unit that takes in a signal charge from the photoelectric conversion unit of the pixel and converts the signal charge to a voltage, an amplifier unit that outputs a signal corresponding to a potential at the charge/voltage conversion unit, a charge transfer unit that transfers the charge from the photoelectric conversion unit to the charge/voltage conversion unit, a reset unit that resets the potential at the charge/voltage conversion unit and a selector unit that selects the pixel.

7. A solid-state imaging device according to claim 6, wherein:

the plurality of pixels form pixel blocks each made up with L (L is an even number equal to or greater than 2) pixels with the photoelectric conversion units thereof set side-by-side in sequence along a columnar direction in which pixel columns extend; and the L pixels in each pixel block share a common set of the charge/voltage conversion unit, the amplifier unit, the reset unit and the selector unit.

8. A solid-state imaging device according to claim 1, wherein:

color filters set in a Bayer array are disposed at the plurality of imaging pixels.

9. An electronic camera, comprising a solid-state imaging device according to claim 1 and a display unit at which a live view display can be brought up, and executing focus adjustment for the optical system through the split-pupil phase difference method and also executing exposure control based upon signals read out in the focus detection and automatic exposure read mode, while a live view image is on display at the display unit based upon signals read out in the live view read mode.

10. A solid-state imaging device according to claim 5, wherein:

an electronic shutter operation through which the L pixels in each pixel block are exposed over a uniform length of time with matching timing is executed with M satisfying the condition.

11. A solid-state imaging device, comprising:

a plurality of pixels disposed in a two-dimensional pattern and each equipped with a photoelectric conversion unit that generates and accumulates a signal charge corresponding to a subject image formed with light entering from an optical system;

a readout control unit that executes control under which signals are read out from the plurality of pixels; and vertical signal lines each disposed in correspondence to at least one column of columns along which the plurality of pixels are arrayed, to which output signals from the pixels in the corresponding columns are provided, wherein:

the plurality of pixels include a plurality of imaging pixels that output imaging signals for forming image signals that represent the subject image and a plurality of focus detection pixels that output focus detection signals for detecting a focusing condition of the optical system through a split-pupil phase difference method;

the readout control unit sequentially and repeatedly executes operation in one or more read modes while a specific operation mode is set;

the one or more read modes include a batch read mode in which imaging signals for live view display, the focus detection signals and imaging signals to be used as photometry information for automatic exposure are read out;

in the batch read mode, signals are read out in a single frame from pixel rows including the focus detection pixels and pixel rows excluding the focus detection pixels; and at least either the signals from the pixel rows including the focus detection pixels or the signals from the pixel rows excluding the focus detection pixels are read out through a discriminative read executed along a columnar direction in which the columns extend.

12. A solid-state imaging device according to claim 11, wherein:

in the single frame of the batch read mode, signals from the imaging pixels in pixel rows excluding the focus detection pixels are read out at intervals of a predetermined number of pixel rows for live view display, signals from the imaging pixels in two successive pixel rows excluding the focus detection pixels that follow each M-row (M is an even number) interval are read out to be used as the photometry information for automatic exposure, and signals from the focus detection pixels are read out to be used as the focus detection signals.

13. An electronic camera, comprising a solid-state imaging device according to claim 11 and a display unit at which a live view display can be brought up, and executing focus adjustment for the optical system through the split-pupil phase difference method and also executing exposure control based upon signals read out in the batch read mode, while a live view image is on display at the display unit based upon signals read out in the batch read mode.

14. A solid-state imaging device comprising:

a plurality of pixels disposed in a two-dimensional pattern and each equipped with a photoelectric conversion unit that generates and accumulates a signal charge corresponding to a subject image formed with light entering from an optical system;

a readout control unit that executes control under which signals are read out from the plurality of pixels; and vertical signal lines each disposed in correspondence to at least one column of columns along which the plurality of pixels are arrayed, to which output signals from the pixels in the corresponding columns are provided, wherein:

the plurality of pixels include a plurality of imaging pixels that output imaging signals for forming image signals that represent the subject image and a plurality of focus detection pixels that output focus detection signals for detecting a focusing condition of the optical system through a split-pupil phase difference method;

the readout control unit sequentially and cyclically executes operation in three or more read modes while a specific operation mode is set;

the three or more read modes include a live view read mode in which imaging signals for live view display are read out, a focus detection read mode in which the focus detection signals are read out, and an automatic exposure read mode in which imaging signals to be used as photometry information for automatic exposure are read out;

in the live view read mode, signals are read out in a single frame from pixel rows excluding the focus detection pixels through a discriminative read executed along a columnar direction in which the columns extend;

in the focus detection read mode, signals are read out in a single frame from pixel rows including the focus detection pixels; and in the automatic exposure read mode, signals are read out in a single frame from two successive pixel rows excluding the focus detection pixels that follow each M-row (M is an even number) interval, the two successive pixel rows including pixel rows that are not read out in the live view read mode.

15. A solid-state imaging device according to claim 14, wherein:

an electronic shutter operation is executed in the focus detection read mode for pixels from which valid signals are to be read out so that the pixels are exposed over equal lengths of time with matching timing.

16. A solid-state imaging device according to claim 14, wherein:

a partial read through which signals are read out from pixels present over a limited area is executed in the focus detection read mode.

17. A solid-state imaging device according to claim 14, wherein:

an electronic shutter operation is executed in the automatic exposure read mode for pixels from which valid signals are to be read out so that the pixels are exposed over equal lengths of time with matching timing.

18. A solid-state imaging device according to claim 14, wherein:

in the automatic exposure read mode, horizontal pixel summing, through which signals from two or more pixels set along a row direction in which pixel rows extend are added together and a sum of the signals is read out, is executed.

19. An electronic camera, comprising a solid-state imaging device according to claim 14 and a display unit at which a live view display can be brought up, and executing focus adjustment for the optical system through the split-pupil phase difference method based upon signals read out in the focus detection read mode and also executing exposure control based upon signals read out in the automatic exposure read mode, while a live view image is on display at the display unit based upon signals read out in the live view read mode.

* * * * *